(12) United States Patent
Isoda et al.

(10) Patent No.: US 12,080,932 B2
(45) Date of Patent: Sep. 3, 2024

(54) IN-VEHICLE FUEL CELL SYSTEM

(71) Applicants: NISSAN MOTOR CO., LTD., Yokohama (JP); AMPERE S.A.S., Boulogne-Billancourt (FR)

(72) Inventors: Hiroyuki Isoda, Kanagawa (JP); Hayato Chikugo, Kanagawa (JP); Masahiro Usuda, Kanagawa (JP)

(73) Assignees: NISSAN MOTOR CO., LTD., Yokohama (JP); AMPERE S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/266,461

(22) PCT Filed: Dec. 10, 2020

(86) PCT No.: PCT/IB2020/001064
§ 371 (c)(1),
(2) Date: Jun. 9, 2023

(87) PCT Pub. No.: WO2022/123280
PCT Pub. Date: Jun. 16, 2022

(65) Prior Publication Data
US 2023/0395838 A1    Dec. 7, 2023

(51) Int. Cl.
*H01M 8/2404* (2016.01)
*H01M 8/04014* (2016.01)
*H01M 8/04082* (2016.01)

(52) U.S. Cl.
CPC ..... *H01M 8/2404* (2016.02); *H01M 8/04014* (2013.01); *H01M 8/04201* (2013.01); *H01M 2250/20* (2013.01)

(58) Field of Classification Search
CPC ........... H01M 8/2404; H01M 8/04014; H01M 8/04201; H01M 2250/20
See application file for complete search history.

(56) References Cited

U.S. PATENT DOCUMENTS

| | | |
|---|---|---|
| 2013/0307330 A1 | 11/2013 | Hotta et al. |
| 2017/0066479 A1* | 3/2017 | Murata ............ H01M 8/04201 |
| 2017/0092964 A1* | 3/2017 | Hickey ............ H01M 8/04014 |
| 2018/0048002 A1 | 2/2018 | Hickey et al. |
| 2018/0099552 A1* | 4/2018 | Murata .................... B60K 1/00 |
| 2020/0161681 A1 | 5/2020 | Lawlor et al. |

FOREIGN PATENT DOCUMENTS

| | | |
|---|---|---|
| CN | 106042878 A | 10/2016 |
| CN | 110495031 A | 11/2019 |
| JP | 2002-050391 A | 2/2002 |
| JP | 2010-238567 A | 10/2010 |
| JP | 2010-287394 A | 12/2010 |
| JP | 2012-158312 A | 8/2012 |
| JP | 2012-221630 A | 11/2012 |
| JP | 2017-047842 A | 3/2017 |
| JP | 2018-041720 A | 3/2018 |

* cited by examiner

*Primary Examiner* — Muhammad S Siddiquee
(74) *Attorney, Agent, or Firm* — Foley & Lardner LLP

(57) ABSTRACT

An in-vehicle fuel cell system, including a fuel cell, and an auxiliary machine configured to exchange a gas with the fuel cell, the in-vehicle fuel system including an auxiliary machine structure configured to accommodate the auxiliary machine, wherein the fuel cell includes a first fuel cell fixed to an upper surface of the auxiliary machine structure and a second fuel cell fixed to a lower surface of the auxiliary machine structure, the auxiliary machine structure is disposed at substantially the same position in a height direction as a skeleton member of a vehicle body, and the first fuel cell and the second fuel cell are fixed to the skeleton member via the auxiliary machine structure.

15 Claims, 15 Drawing Sheets

IN-VEHICLE FUEL CELL SYSTEM

TECHNICAL FIELD

The present invention relates to an in-vehicle fuel cell system.

BACKGROUND ART

JP 2012-221630 A discloses a fuel cell system in which a plurality of fuel cell stacks are stacked on a structure including a heat exchanger, a reformer, a combustor, and the like.

SUMMARY OF INVENTION

However, when the fuel cell system disclosed in JP 2012-221630 A is mounted on a vehicle, the structure is fixed to the vehicle, but a height of the structure in a lowermost portion of the fuel cell system is different from that of a vehicle skeleton, and thus it is necessary to increase a size of a bracket for attaching the structure to the vehicle skeleton, and a weight increases accordingly. Since the lowermost portion of the fuel cell system is fixed by the large bracket, an amplitude of swing of the fuel cell system and the bracket increases during operation, and there is a concern that vibration damping performance and steering stability of the vehicle may be impaired.

Therefore, an object of the invention is to provide an in-vehicle fuel cell system that suppresses an increase in weight of a vehicle and suppresses a decrease in vibration damping performance and steering stability of the vehicle.

An in-vehicle fuel cell system according to one embodiment of the present invention is an in-vehicle fuel cell system including a fuel cell, and an auxiliary machine configured to exchange a gas with the fuel cell, the in-vehicle fuel system including an auxiliary machine structure configured to accommodate the auxiliary machine, wherein the fuel cell includes a first fuel cell fixed to an upper surface of the auxiliary machine structure and a second fuel cell fixed to a lower surface of the auxiliary machine structure, the auxiliary machine structure is disposed at substantially the same position in a height direction as a skeleton member of a vehicle body, and the first fuel cell and the second fuel cell are fixed to the skeleton member via the auxiliary machine structure.

DESCRIPTION OF EMBODIMENTS

Hereinafter, embodiments of the invention will be described with reference to the drawings.

[Electric Vehicle on which In-Vehicle Fuel Cell System is Mounted]

Figure 1:
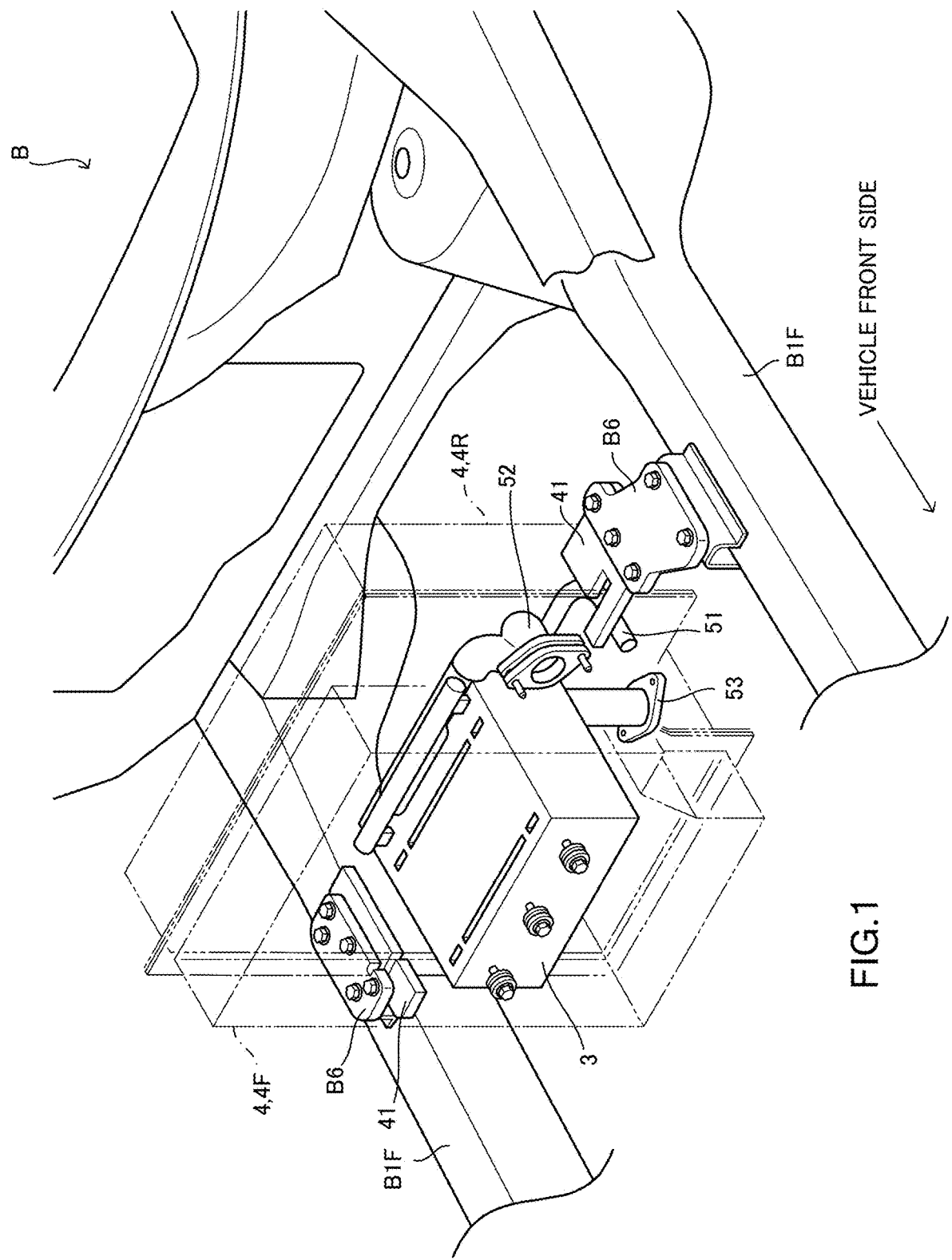
FIG. 1 is a perspective view illustrating an example in which an in-vehicle fuel cell system according to the present embodiment is mounted on a vehicle front side.
Figure 2:
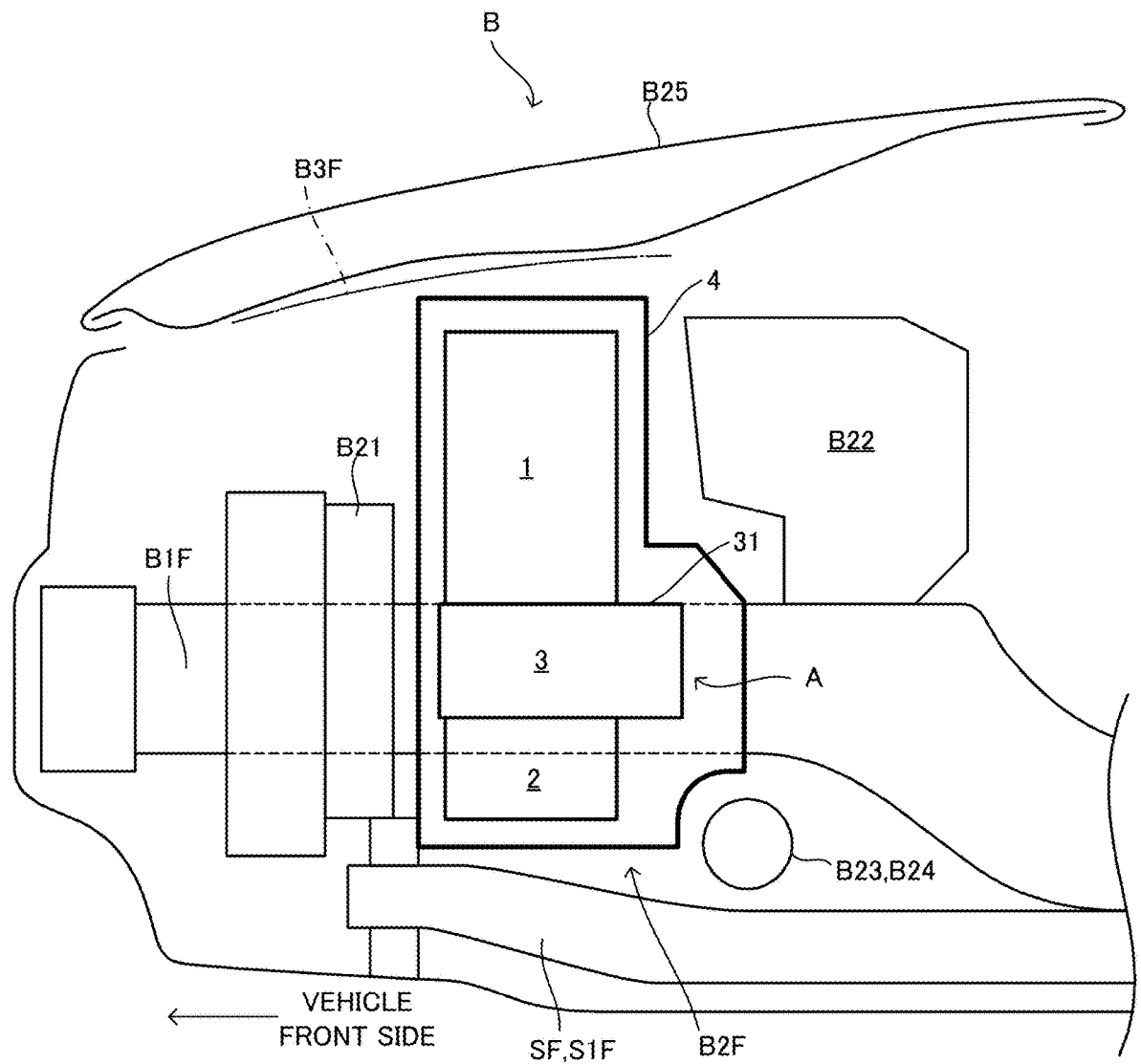
FIG. 2 is a side view illustrating the example in which the in-vehicle fuel cell system according to the present embodiment is mounted on the vehicle front side.

FIG. 1 is a perspective view illustrating an example in which an in-vehicle fuel cell system according to the present embodiment is mounted on a vehicle front side. FIG. 2 is a side view illustrating the example in which the in-vehicle fuel cell system according to the present embodiment is mounted on the vehicle front side. In FIG. 1, a first fuel cell stack 1 and a second fuel cell stack 2, which will be described later, are not illustrated.

The in-vehicle fuel cell system (hereinafter, referred to as a "fuel cell system") according to the present embodiment is mounted on an electric vehicle that travels by a drive motor 73 (see FIG. 7).

The electric vehicle includes a vehicle body B that is formed with a prime mover chamber (a front prime mover chamber B2F (see FIG. 3) or a rear prime mover chamber B2R (see FIG. 12)), a cabin B4 (see FIG. 12), and the like, and a front suspension device SF (see FIG. 3) and a rear suspension device SR (see FIG. 12) that support the vehicle body B using a restoring force.

As the electric vehicle to which the present embodiment is applied, an FF vehicle (an FR vehicle) or an RR vehicle to be described later is applied.

When the electric vehicle is the FF vehicle (the FR vehicle), the front prime mover chamber B2F is disposed on a front side of the vehicle body B. Side members B1F (skeleton members) are disposed on the front side of the vehicle body B in a manner of extending in a front-rear direction of the electric vehicle and sandwiching the front prime mover chamber B2F therebetween in a vehicle width direction. In the front prime mover chamber B2F (the same applies to the rear prime mover chamber B2R to be described later), a space occupying a position higher than the side member B1F is defined as a first internal space, and a space occupying a position lower than the side member B1F is defined as a second internal space.

In a case of the FF vehicle, the front suspension device SF has a structure in which a wheel (not illustrated), a spring (not illustrated) that supports the vehicle body B via an arm (not illustrated) (or a link (not illustrated)) to which a knuckle (not illustrated) that holds the wheel and enables steering is attached, and a shock absorber (not illustrated) that absorbs vibration from a road surface are attached to a sub-frame 51F (a structural skeleton) on which a drive device B23 (the drive motor 73 (see FIG. 7), and a transaxle device (not illustrated)), and a steering device B24 are mounted. Similarly, in a case of the RR vehicle, the rear suspension device SR (see FIG. 12) has a structure in which a wheel (not illustrated), a spring (not illustrated) that supports the vehicle body B via an arm (not illustrated) (or a link (not illustrated)) to which a hub (not illustrated) that holds the wheel is attached, and a shock absorber (not illustrated) that absorbs vibration from a road surface are attached to a sub-frame S1R (see FIG. 12).

In a case of the FR vehicle, the front suspension device SF has a structure in which a wheel (not illustrated), a spring (not illustrated) that supports the vehicle body B via an arm (not illustrated) (or a link (not illustrated)) to which a knuckle (not illustrated) that holds the wheel and enables steering is attached, and a shock absorber (not illustrated) that absorbs vibration from a road surface are attached to the sub-frame 51F on which the drive device B23 (the drive motor 73 (see FIG. 7)) and the steering device B24 (not illustrated) are mounted. The rear suspension device SR (see FIG. 12) has a structure in which a wheel (not illustrated), a spring (not illustrated) that supports the vehicle body B via an arm (not illustrated) (or a link (not illustrated)) to which a hub (not illustrated) that holds the wheel is attached, and a shock absorber (not illustrated) that absorbs vibration from a road surface are attached to the sub-frame S1R on which a transaxle device (not illustrated) is mounted, and a driving force from the drive motor 73 (see FIG. 7) is transmitted to the transaxle device (not illustrated) via a propeller shaft (not illustrated). A configuration in which the drive motor 73 and the transaxle device (not illustrated) are integrated and attached to the rear suspension device SR, and thus the propeller shaft (not illustrated) is omitted can also be applied.

As illustrated in FIG. 2, a cooling device B21 such as a radiator is disposed on the vehicle front side of the front prime mover chamber B2F.

An outfitting component B22 is disposed on a vehicle rear side in the first internal space of the front prime mover chamber B2F. As the outfitting component B22, an air box (a built-in wiper system), braking system components (a master cylinder, a booster, a hydraulic pump, an ABS/VDC ACTR, and the like), and air conditioning system components (a heater hose, and an A/C TUBE) are disposed. The drive device B23 (the drive motor 73 (see FIG. 7), and the transaxle device), and the steering device B24 are disposed on the vehicle rear side in the second internal space of the front prime mover chamber B2F. An in-vehicle battery 72 (see FIG. 7) is disposed at a lower central portion of the vehicle.

In the electric vehicle, during traveling, the drive motor 73 (see FIG. 7) is driven by supplying electric power from the in-vehicle battery 72 (see FIG. 7) to the drive motor 73 via an inverter (not illustrated), and during decelerating, regenerative electric power generated by the drive motor 73 is supplied to the in-vehicle battery 72 via the inverter (not illustrated) to charge the in-vehicle battery 72.

When an SOC (a charge amount) of the in-vehicle battery 72 reaches a predetermined lower limit value, the fuel cell system is started, and fuel cell stacks (the first fuel cell stack 1, and the second fuel cell stack 2) are caused to generate electric power to charge the in-vehicle battery 72.

When the SOC of the in-vehicle battery 72 reaches a predetermined upper limit value, the electric power generation is stopped.

Electric power of auxiliary machines (a compressor 64 (see FIG. 7) and the like) constituting the fuel cell system is supplied from the in-vehicle battery 72 or an auxiliary machine battery (not illustrated). The auxiliary machine battery (not illustrated) is supplied with electric power from the fuel cell stacks.

[Arrangement of Fuel Cell System]

The fuel cell system according to the present embodiment is disposed at a position between the cooling device B21 and the outfitting component B22 (and the drive device B23, and the steering device B24) in the front prime mover chamber B2F.

As illustrated in FIG. 2, the fuel cell system according to the present embodiment includes a stacked structure A in which the first fuel cell stack 1 (a first fuel cell) and the second fuel cell stack 2 (a second fuel cell) are attached to an auxiliary machine structure 3 (a manifold) which is a housing including auxiliary machines (a heat exchanger 65, a combustor 67, and the like) of the fuel cell stack, and the second fuel cell stack 2, the auxiliary machine structure 3, and the first fuel cell stack 1 are stacked in order from the bottom. Further, the stacked structure A is accommodated in a case 4, and the case 4 is attached to the side member B1F via brackets (a case-side bracket 41, and a vehicle-side bracket B6) (FIG. 1). Details of the stacked structure A will be described later.

As illustrated in FIG. 1, the case 4 includes a tray-shaped front case 4F that accommodates the stacked structure A in the vehicle front side and to which the auxiliary machine structure 3 is attached, and a rear case 4R that accommodates the stacked structure A in the vehicle rear side and is connected to the front case 4F. The front case 4F and the rear case 4R are connected to each other with their opening portions aligned with each other, but a part of the opening portion of the rear case 4R remains open, and pipes connected to the auxiliary machine structure 3 extend from the open portion.

The case-side bracket 41 extends from a position of the case 4 at substantially the same height as the auxiliary machine structure 3 (the side member B1F). On the other hand, the vehicle-side bracket B6 is attached to the side member B1F at a position facing the case-side bracket 41. When the case-side bracket 41 is screwed to the vehicle-side bracket B6, the case 4 including the stacked structure A is fixed to the side member B1F.

The case 4 suppresses a decrease in a temperature of the fuel cell stack by avoiding a traveling wind blowing to the stacked structure A, but may be omitted when an influence of the traveling wind is small. In this case, for example, the auxiliary machine structure 3 is attached to the side member B1F via the vehicle-side bracket B6, or the auxiliary machine structure 3 is directly attached to the side member B1F. Since the case 4 also has a function of protecting the stacked structure A from curbstones or the like that enter the front prime mover chamber B2F (and the rear prime mover chamber B2R) from the road surface, it is also preferable to dispose the case 4 in a manner of covering at least a lower portion of the stacked structure A.

In the present embodiment, as illustrated in FIG. 2, the auxiliary machine structure 3 is disposed at substantially the same height as the side member B1F. The first fuel cell stack 1 is disposed in the first internal space, and the second fuel cell stack 2 is disposed in the second internal space. In the front prime mover chamber B2F, a distance in a height direction between the side member B1F and a hood B25 (a bonnet) that covers the front prime mover chamber B2F from above (a height of the first internal space) is longer than a distance in the height direction between the side member B1F and the sub-frame 51F (a height of the second internal space). Therefore, by setting the number of stacked fuel cells in the first fuel cell stack 1 to be larger than the number of stacked fuel cells in the second fuel cell stack 2, a dimension of the first fuel cell stack 1 in the height direction is set to be larger than a dimension of the second fuel cell stack 2 in the height direction.

An upper end of the first fuel cell stack 1 (including an upper end of the case 4) is disposed lower than a virtual plane B3F which is set lower than the hood B25 (the bonnet) by a predetermined distance. Accordingly, a gap for impact reduction can be secured between the hood B25 and the stacked structure A (including the case 4), and thus for example, an impact on human at the time of occurrence of a traffic accident can be reduced, and particularly, a head of a pedestrian can be protected.

A lower end of the second fuel cell stack 2 (including the case 4) is set higher than a lower end of the sub-frame 51F constituting the front suspension device SF. Accordingly, a direct hit caused by an on-road obstacle such as a curbstone or a rut can be avoided.

Incidentally, even though a curbstone or the like collides with the case 4, it is difficult to detect a crack of the case 4 if damage due to the collision is small. However, even if the crack is small, there is a possibility that problems such as electric leakage or gas leakage of a high-temperature gas may occur during traveling in rainy weather or the like.

However, the sub-frame 51F is one of strongest components among vehicle body system components. Therefore, when the sub-frame 51F is damaged, the traveling is influenced, and thus an abnormality of the front suspension device SF (or the rear suspension device SR) can be easily detected, and the damage of the case 4 can be easily estimated at that time.

As illustrated in FIG. 2, an end portion (a side surface) of the stacked structure A (the first fuel cell stack 1, the auxiliary machine structure 3, and the second fuel cell stack 2) on the front side of the electric vehicle is formed at substantially the same plane. Accordingly, the stacked structure A (including the case 4) can be disposed close to the cooling device B21, and a space behind the stacked structure A (including the case 4) can be expanded accordingly.

Figure 3:
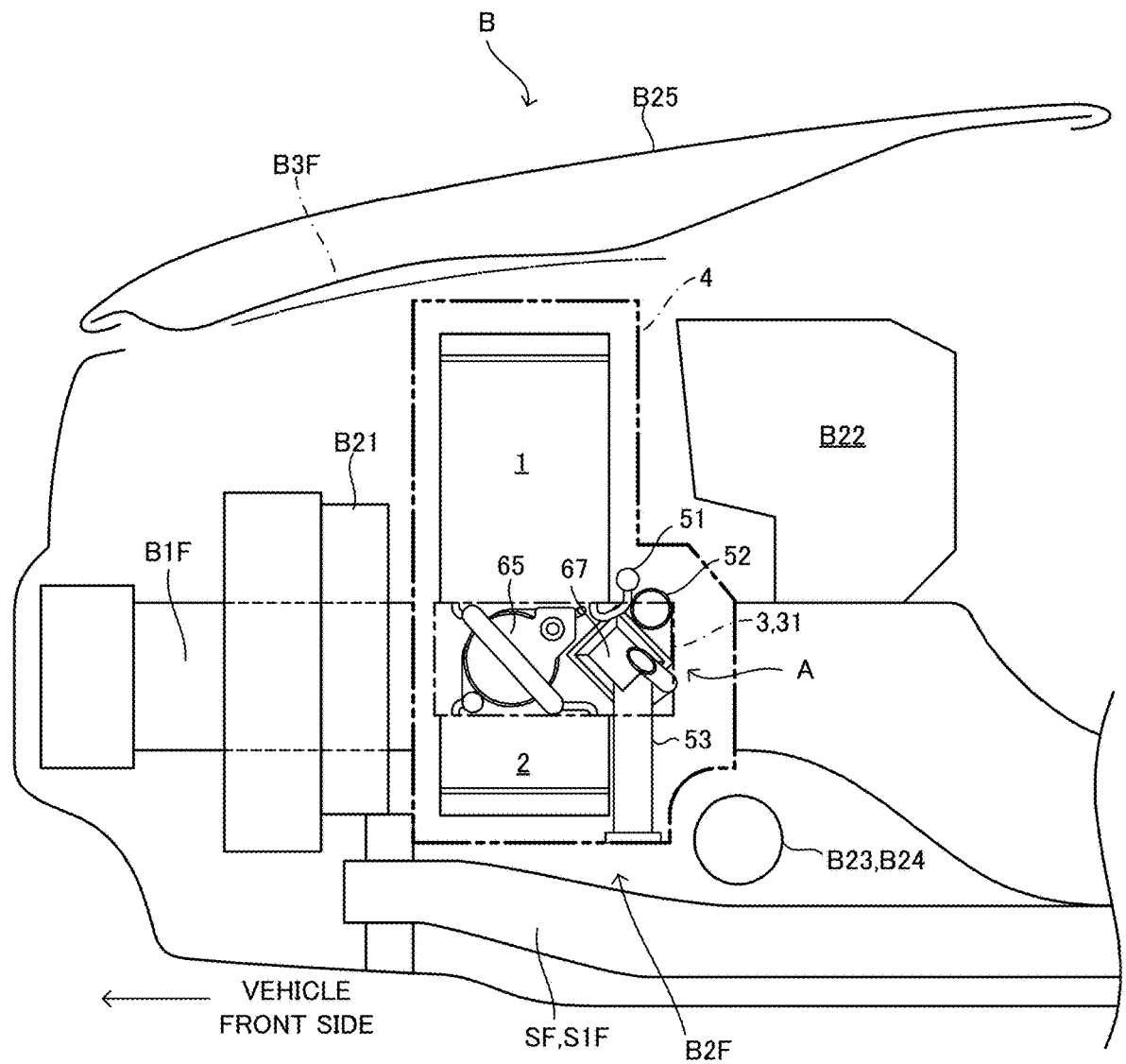
FIG. 3 is a side view illustrating pipes attached to the in-vehicle fuel cell system according to the present embodiment.
Figure 4:
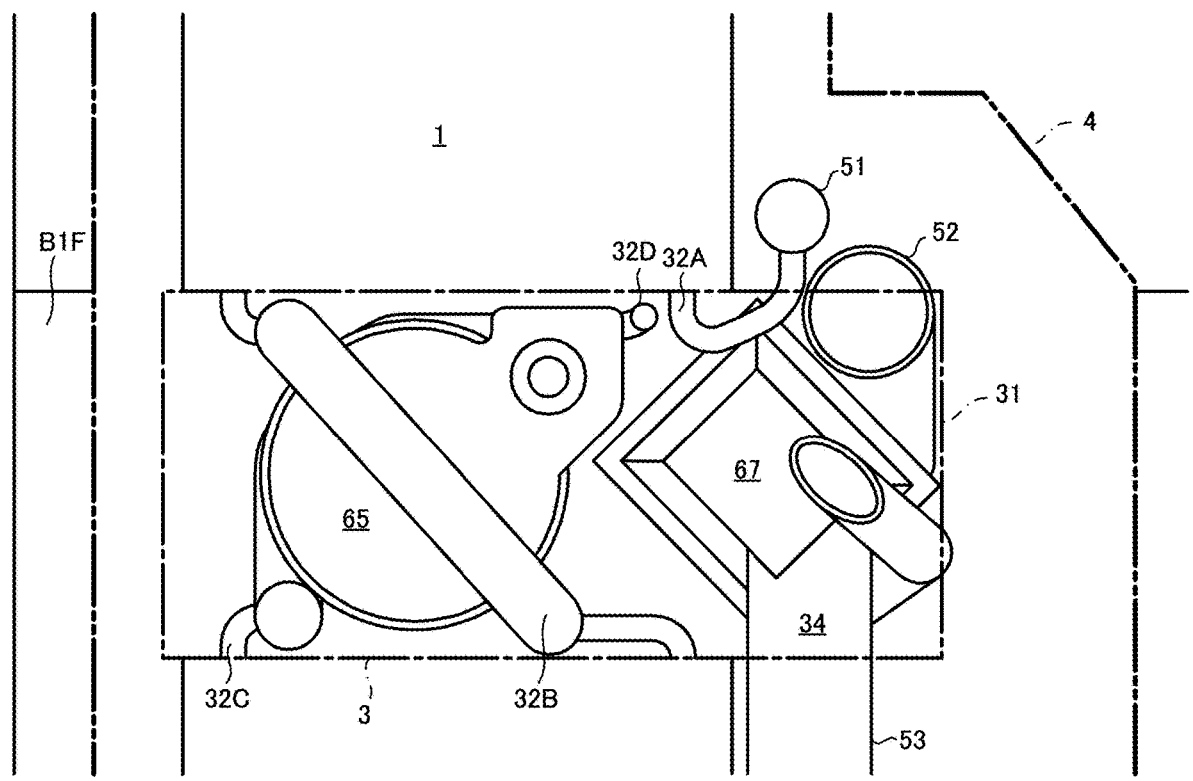
FIG. 4 is a partially enlarged view of FIG. 3.

FIG. 3 is a side view illustrating pipes attached to the in-vehicle fuel cell system according to the present embodiment. FIG. 4 is a partially enlarged view of FIG. 3.

At an end portion of the stacked structure A on the vehicle rear side, a part of the auxiliary machine structure 3 is formed as a protruding portion 31 that protrudes rearward relative to the first fuel cell stack 1 and the second fuel cell stack 2.

As will be described in detail later, as illustrated in FIG. 3, at least one of pipes (a fuel supply pipe 51, an air supply pipe 52, and an off-gas exhaust pipe 53) for supplying fuel (an anode gas) and air (a cathode gas) to the first fuel cell stack 1 and the second fuel cell stack 2 is attached to the protruding portion 31 of the auxiliary machine structure 3.

Here, the fuel supply pipe 51 supplies fuel supplied from a fuel tank 61 (see FIG. 7) to the auxiliary machine structure 3. The air supply pipe 52 supplies air supplied from the compressor 64 (see FIG. 7) to the auxiliary machine structure 3. The off-gas exhaust pipe 53 discharges an off-gas (a combustion gas) discharged from the auxiliary machine structure 3 to the outside.

With such a configuration, the combustor 67 and the heat exchanger 65 can be disposed directly below the first fuel cell stack 1 and directly above the second fuel cell stack 2. Therefore, the off-gas (a fuel off-gas, and an air off-gas) discharged from the fuel cell stack can be supplied to the combustor 67 in a shortest distance, and air heated by the heat exchanger 65 can be supplied to the fuel cell stack in a shortest distance. Heat generated by the combustor 67 (the heat exchanger 65) is easily transferred to the fuel cell stack, and a thermal efficiency is improved. Further, by disposing the pipes (the fuel supply pipe 51, the air supply pipe 52, and the off-gas exhaust pipe 53) behind the stacked structure A, a risk of damage to the pipes can be avoided when a frontal collision of the electric vehicle occurs. The heat exchanger 65 may be disposed adjacent to the combustor 67 as illustrated in FIGS. 3 and 4, or may be disposed inside the combustor 67 as illustrated in FIG. 7 and the like.

Although not illustrated, the fuel tank 61, the compressor 64, the auxiliary machine battery, and the like constituting the fuel cell system can be disposed at positions adjacent to the case 4 in the width direction of the electric vehicle (positions on a right side relative to the case 4 in FIG. 6) in the front prime mover chamber B2F.

Comparison Between Present Embodiment and Comparative Example

Figure 5:
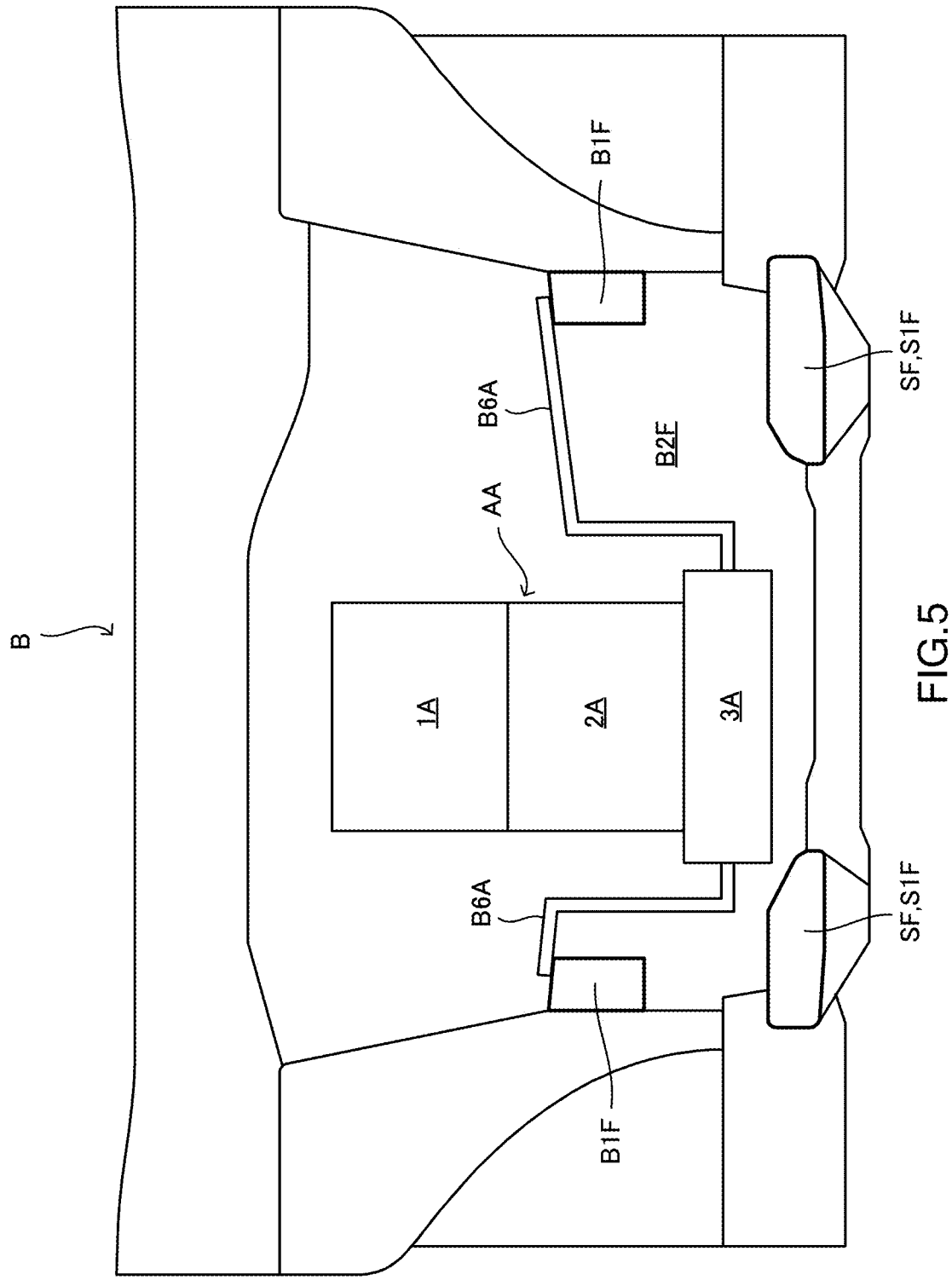
FIG. 5 is a view from the vehicle front side in a case where an in-vehicle fuel cell system according to a comparative example is mounted on the vehicle front side.
Figure 6:
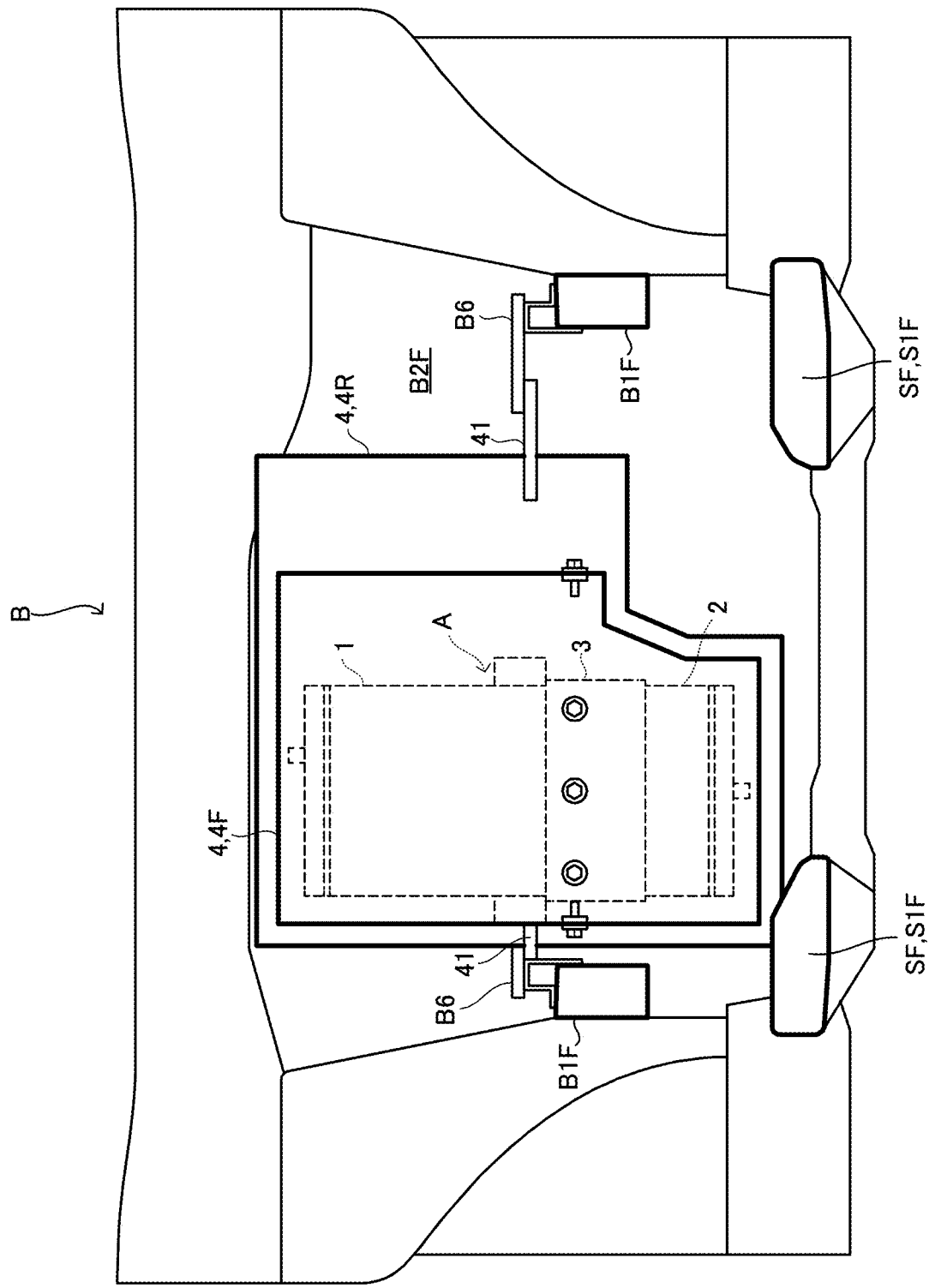
FIG. 6 is a view from the vehicle front side of the example in which the in-vehicle fuel cell system according to the present embodiment is mounted on the vehicle front side.

FIG. 5 is a view from the vehicle front side in a case where an in-vehicle fuel cell system according to a comparative example is mounted on the vehicle front side. FIG. 6 is a view from the vehicle front side in the example in which the in-vehicle fuel cell system according to the present embodiment is mounted on the vehicle front side.

The fuel cell system according to the comparative example illustrated in FIG. 5 has the same configuration as that according to JP 2012-221630 A described above, and includes a stacked structure AA in which a second fuel cell stack 2A and a first fuel cell stack 1A are disposed in order on an auxiliary machine structure 3A including a combustor, a heat exchanger, a reformer, and the like.

When such a stacked structure AA is disposed in the front prime mover chamber B2F, the stacked structure AA is fixed to the side member B1F by using, for example, a bracket B6A as in the invention. However, in the stacked structure AA according to the comparative example, the auxiliary machine structure 3A that can be connected to the bracket B6A is a lowermost portion of the stacked structure AA, and thus the auxiliary machine structure 3A is disposed at a position lower than the side member B1F. Therefore, a size of the bracket B6A for attaching the auxiliary machine structure 3A to the side member B1F increases, and a weight increases accordingly. A length of a component extending in a vertical direction of the bracket B6A and a distance between the first fuel cell stack 1A and a portion fixed by the bracket B6A (the auxiliary machine structure 3A) in the stacked structure AA increase. Therefore, an amplitude of swing of the stacked structure AA and the bracket B6A increases during operation, and there is a concern that vibration damping performance and steering stability of the vehicle may be impaired.

On the other hand, the auxiliary machine structure 3 constituting the stacked structure A according to the present embodiment illustrated in FIG. 6 is disposed at substantially the same height as the side member B1F. Therefore, a center of gravity of the stacked structure A is at substantially the same height as the side member B1F, and the brackets (the case-side bracket 41, and the vehicle-side bracket B6) can be connected to the stacked structure A at a position at a height position of the center of gravity of the stacked structure A (including the case 4). Accordingly, sizes of the brackets (the case-side bracket 41, and the vehicle-side bracket B6) can be reduced, and the center of gravity of the stacked structure A is close to the brackets (the case-side bracket 41, and the vehicle-side bracket B6), and thus it is possible to suppress an amplitude of swing of the stacked structure A and the brackets (the case-side bracket 41, and the vehicle-side bracket B6) during operation, and to improve vibration damping performance and steering stability of the vehicle.

In the stacked structure AA according to the comparative example, height dimensions (the number of stacked fuel cells) of the first fuel cell stack 1A and the second fuel cell stack 2A are the same. Therefore, in the stacked structure AA according to the comparative example, if a configuration in which the auxiliary machine structure 3A is sandwiched between the first fuel cell stack 1A and the second fuel cell stack 2A is constructed, and the stacked structure AA is mounted on the front prime mover chamber B2F in a manner that the auxiliary machine structure 3A is fixed to the side member B1F via the bracket, a problem in arrangement such as the second fuel cell stack 2A being lower than a lower end of the sub-frame S1F or the first fuel cell stack 1A coming into contact with the hood B25 occurs.

In contrast, in the stacked structure A according to the present embodiment, the number of stacks in the first fuel cell stack 1 can be set according to an interval between the side member B1F and the virtual plane B3F, and the number of stacks in the second fuel cell stack 2 can be set according to an interval between the side member B1F and the lower end of the sub-frame S1F. Therefore, the stacked structure A (including the case 4) can be mounted on the front prime mover chamber B2F without exceeding the virtual plane B3F and without protruding from the lower end of the sub-frame S1F. Therefore, the stacked structure A (including the case 4) can be mounted on the front prime mover chamber B2F in an optimal state without changing a design of the electric vehicle, and an output of the fuel cell stack can be optimized.

[Basic Configuration and Operation of In-Vehicle Fuel Cell Stack]

Figure 7:
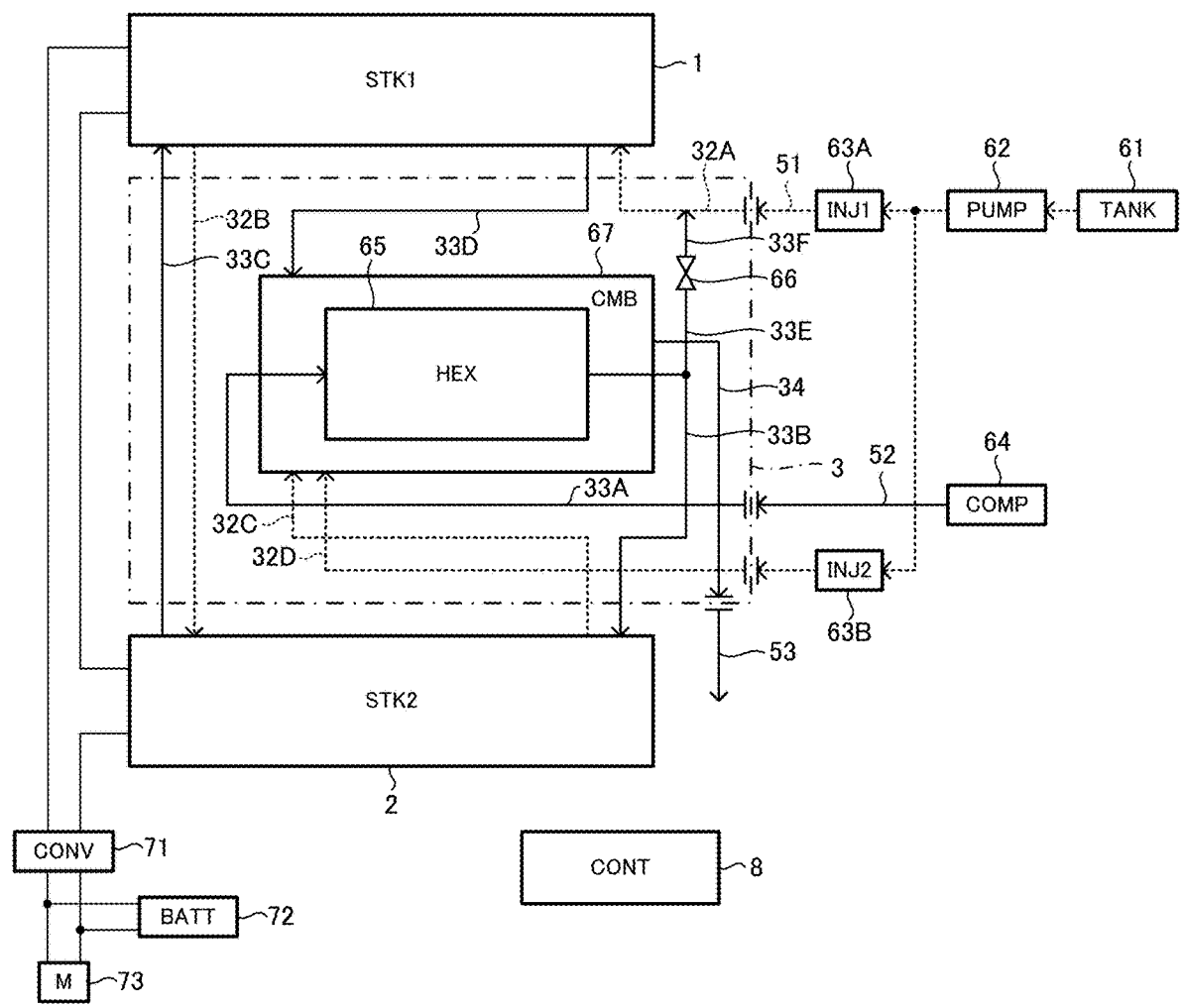
FIG. 7 is a diagram illustrating a basic configuration of the in-vehicle fuel cell system according to the present embodiment.

FIG. 7 is a diagram illustrating a basic configuration of the in-vehicle fuel cell system according to the present embodiment. As described above, the fuel cell system according to the present embodiment has a configuration in which the auxiliary machine structure 3 is disposed between the first fuel cell stack 1 and the second fuel cell stack 2.

For example, the combustor 67, the heat exchanger 65 disposed inside the combustor 67, and a valve 66 are accommodated in the auxiliary machine structure 3.

The auxiliary machine structure 3 includes fuel flow paths 32A each connected to the fuel supply pipe 51 and connecting the fuel supply pipe 51 and an anode inlet of the first fuel cell stack 1, fuel flow paths 32B each connecting an anode outlet of the first fuel cell stack 1 and an anode inlet of the second fuel cell stack 2, a fuel flow path 32C connecting an anode outlet of the second fuel cell stack 2 and a fuel inlet of the combustor 67, and a fuel flow path 32D communicating with a second injector 63B and connected to the fuel inlet of the combustor 67.

The auxiliary machine structure 3 includes an air flow path 33A connected to the air supply pipe 52 and connecting the air supply pipe 52 and an inlet of the heat exchanger 65, an air flow path 33B connecting an outlet of the heat exchanger 65 and a cathode inlet of the second fuel cell stack 2, an air flow path 33C connecting a cathode outlet of the second fuel cell stack 2 and a cathode inlet of the first fuel cell stack 1, an air flow path 33D connecting a cathode outlet of the first fuel cell stack 1 and an air inlet of the combustor 67, an air flow path 33E branching from a middle of the air flow path 33B and connected to an inlet of the valve 66, and an air flow path 33F connecting an outlet of the valve 66 and the fuel flow path 32A.

The auxiliary machine structure 3 includes an off-gas flow path 34 connected to the off-gas exhaust pipe 53 and connecting an outlet of the combustor 67 and the off-gas exhaust pipe 53.

The fuel cell system according to the present embodiment includes a fuel supply system that supplies fuel (the anode gas) to anodes of the first fuel cell stack 1 and the second fuel cell stack 2, respectively, an air supply system that supplies air (the cathode gas) to cathodes of the first fuel cell stack 1 and the second fuel cell stack 2, a gas combustion system that mixes and combusts the fuel off-gas discharged from the first fuel cell stack 1 and the air off-gas discharged from the second fuel cell stack 2, and an electric power supply system that causes the first fuel cell stack 1 and the second fuel cell stack 2 to generate electric power and supplies an extraction current to the in-vehicle battery 72.

The fuel cell system according to the present embodiment includes a controller 8 that integrally controls the fuel supply system, the air supply system, the gas combustion system, and the electric power supply system.

In the fuel cell system according to the present embodiment, the auxiliary machine structure 3 is disposed between the first fuel cell stack 1 and the second fuel cell stack 2, and accommodates a part of the fuel supply system, the air supply system, and the gas combustion system.

The fuel supply system includes the fuel tank 61 (TANK), a pump 62 (PUMP), and a first injector 63A (INJ1). The pump 62 pressurizes fuel stored in the fuel tank 61 and supplies the pressurized fuel to the first injector 63A, and the first injector 63A supplies the fuel pressurized by the pump 62 to the anode of the first fuel cell stack 1. In the fuel supply system, the anode of the first fuel cell stack 1 and the anode of the second fuel cell stack 2 are connected in series by the fuel flow path 32B, and are connected in a manner that the anode of the first fuel cell stack 1 is on an upstream side.

The air supply system includes the compressor 64 (COMP), the heat exchanger 65 (HEX), and the valve 66. The compressor 64 introduces outside air and supplies the outside air to the heat exchanger 65, and the air heated by the heat exchanger 65 is supplied to the cathode of the second fuel cell stack 2. In the air supply system, the cathode of the first fuel cell stack 1 and the cathode of the second fuel cell stack 2 are connected in series by the air flow path 33C, and are connected in a manner that the cathode of the second fuel cell stack 2 is on an upstream side. The valve 66 branches from the air flow path 33B and supplies air (oxygen) heated by the heat exchanger 65 to the anode of the first fuel cell stack 1 through the fuel flow path 32A at a predetermined flow rate.

The gas combustion system includes the combustor 67 (CMB) and the second injector 63B (INJ2). The second injector 63B (INJ2) is connected in parallel with the first injector 63A (INJ1) with respect to the pump 62, and supplies fuel to the combustor 67. The combustor 67 mixes fuel supplied from the second injector 63B (INJ2) and air (oxygen) supplied from the cathode of the second fuel cell stack 2 during the starting of the fuel cell system to generate a combustion gas, and heats the heat exchanger 65 (and the first fuel cell stack 1 and the second fuel cell stack 2) by the combustion gas. The combustor 67 mixes the fuel off-gas discharged from the anode of the second fuel cell stack 2 and the air off-gas discharged from the cathode of the first fuel cell stack 1 during generation of electric power by the first fuel cell stack 1 and the second fuel cell stack 2 to generate a combustion gas, and heats the heat exchanger 65 and the like. The combustion gas is finally discharged to the outside through the off-gas exhaust pipe 53.

The electric power supply system includes a DC/DC converter 71 (CONV) that electrically connects the fuel cell stack to the in-vehicle battery 72 (BATT) (or the auxiliary machine battery) and the drive motor 73 (M).

The fuel cell stack (the first fuel cell stack 1, and the second fuel cell stack 2) is a solid oxide fuel cell (SOFC). A catalyst for steam reforming (and partial oxidation reforming) the fuel is disposed in the first fuel cell stack 1. Further, air (oxygen) is supplied to the anode of the first fuel cell stack 1 via the valve 66 at a predetermined flow rate, and partial oxidation reforming can be performed on the fuel.

When the SOC of the in-vehicle battery 72 reaches the predetermined lower limit value, the controller 8 starts the pump 62 and the second injector 63B to supply fuel to the combustor 67, and starts the compressor 64 to supply air (oxygen) to the combustor 67. Accordingly, the fuel and air (oxygen) are combusted in a mixed state in the combustor 67 to generate a combustion gas, thereby warming up the combustor 67 (the heat exchanger 65), the first fuel cell stack 1, and the second fuel cell stack 2.

When a temperature of the combustor 67 reaches a predetermined temperature and temperatures of the first fuel cell stack 1 and the second fuel cell stack 2 reach a temperature at which the first fuel cell stack 1 and the second fuel cell stack 2 can generate electric power, the controller 8 stops the second injector 63B, starts the first injector 63A, and starts the DC/DC converter 71. Accordingly, the first fuel cell stack 1 and the second fuel cell stack 2 start generating electric power.

At this time, in the first fuel cell stack 1, the fuel is subjected to steam reforming (an endothermic reaction) via the catalyst to be reformed into fuel containing hydrogen, and this fuel is used for electric power generation in the first fuel cell stack 1 and the second fuel cell stack 2. The controller 8 controls the valve 66 to supply air (oxygen) to the first fuel cell stack 1, and causes partial oxidation reforming (an exothermic reaction) of the fuel via the catalyst to suppress a decrease in the temperature of the first fuel cell stack 1.

When the SOC of the in-vehicle battery 72 reaches the predetermined upper limit value, the controller 8 stops generation of electric power by the first fuel cell stack 1 and the second fuel cell stack 2 by stopping the DC/DC converter 71. Further, driving of the compressor 64 is continued to decrease the temperature of the fuel cell stack while the pump 62 and the first injector 63A are stopped. When the temperature of the fuel cell stack is decreased to a predetermined temperature, the controller 8 stops the compressor 64.

[Structure of Fuel Cell System]

Figure 8:
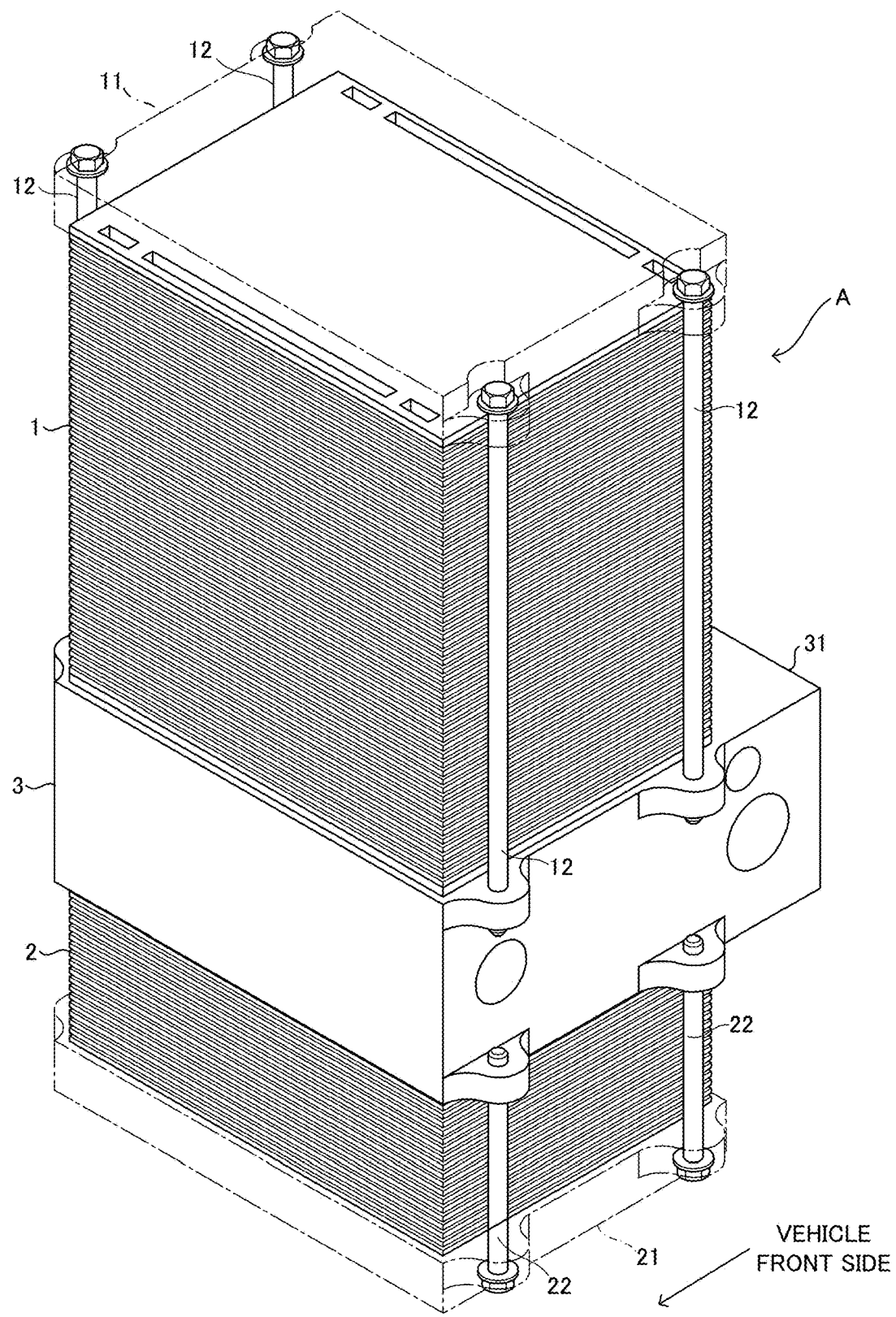
FIG. 8 is a perspective view illustrating fuel cell stacks and an auxiliary machine structure, which are components of the in-vehicle fuel cell system according to the present embodiment.
Figure 9:
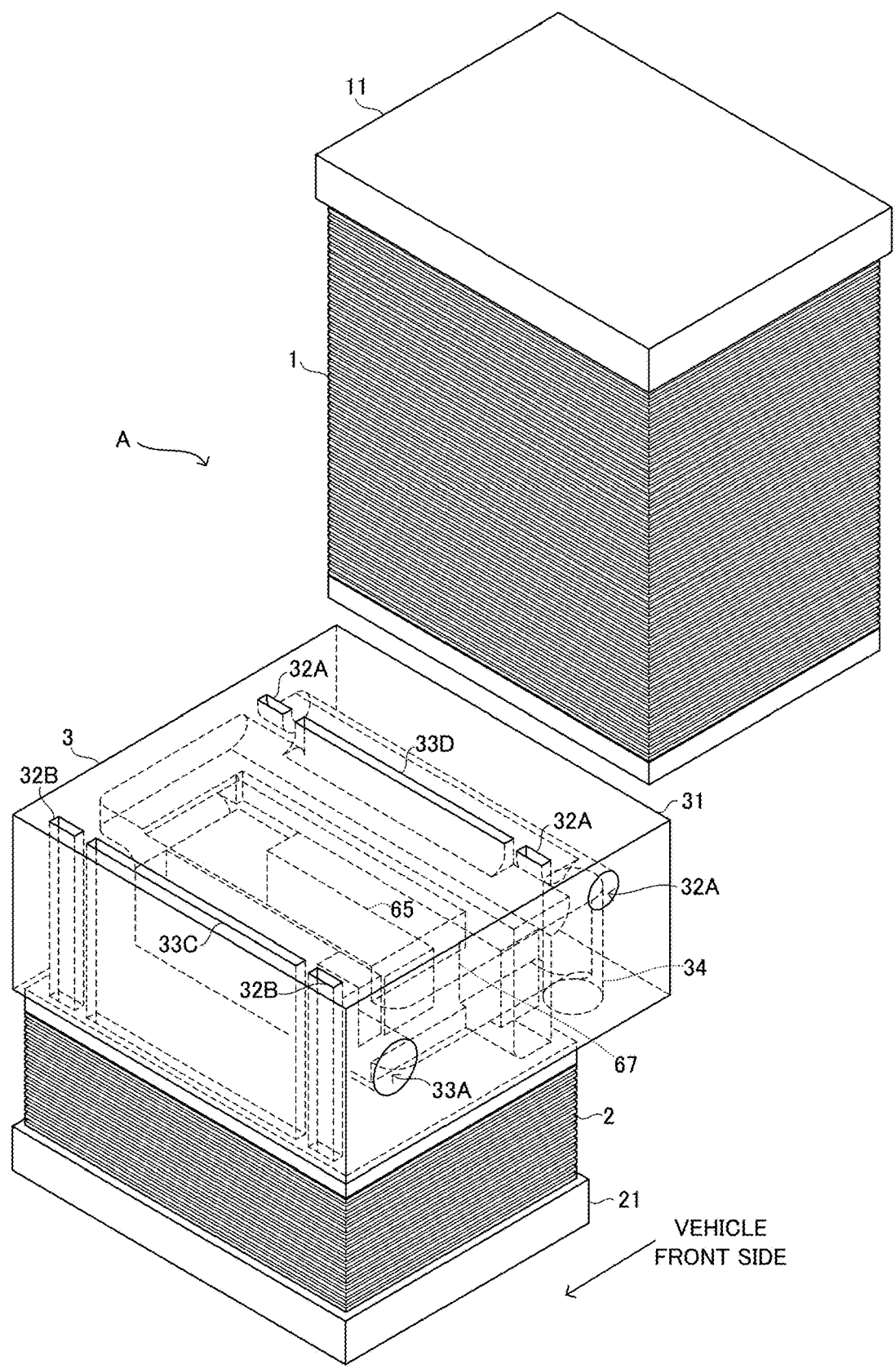
FIG. 9 is an exploded perspective view illustrating the fuel cell stacks and the auxiliary machine structure, which are components of the in-vehicle fuel cell system according to the present embodiment.
Figure 10:
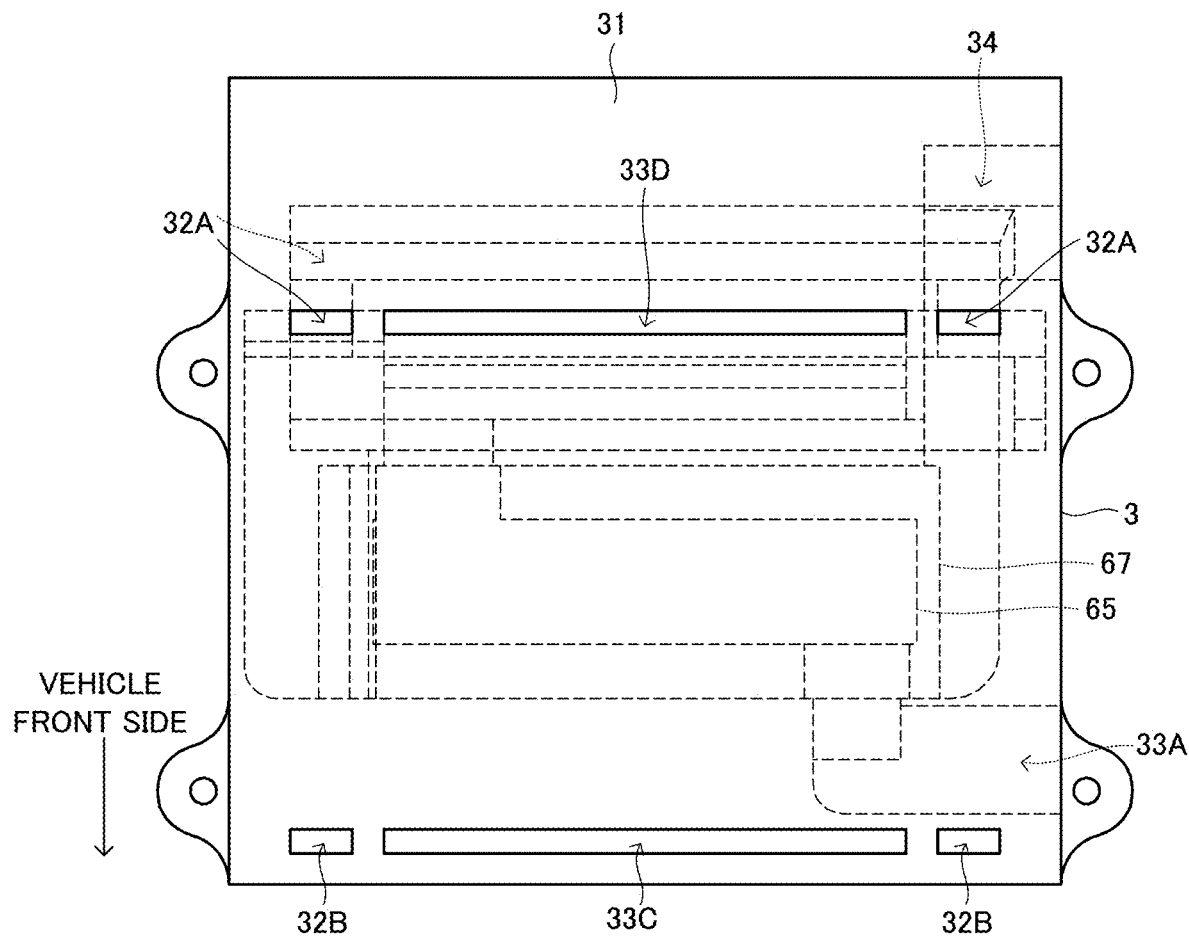
FIG. 10 is a plan view illustrating the auxiliary machine structure constituting the in-vehicle fuel cell system according to the present embodiment.
Figure 11:
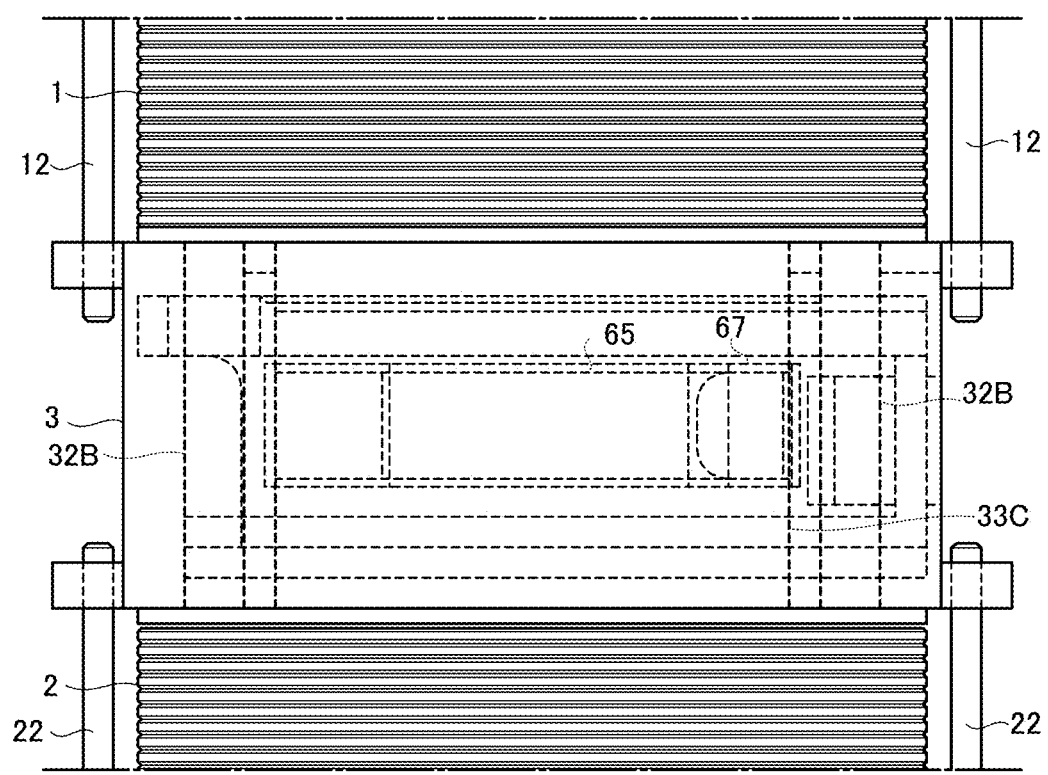
FIG. 11 is a front view illustrating the in-vehicle fuel cell system according to the present embodiment.

FIG. 8 is a perspective view illustrating the fuel cell stack 2 and the auxiliary machine structure 3, which are components of the in-vehicle fuel cell system according to the present embodiment. FIG. 9 is an exploded perspective view illustrating the fuel cell stack 2 and the auxiliary machine structure 3, which are components of the in-vehicle fuel cell system according to the present embodiment. FIG. 10 is a plan view illustrating the auxiliary machine structure 3 constituting the in-vehicle fuel cell system according to the present embodiment. FIG. 11 is a front view illustrating the in-vehicle fuel cell system according to the present embodiment.

As described above, the fuel cell system according to the present embodiment is the stacked structure A in which the auxiliary machine structure 3 is disposed between the first fuel cell stack 1 and the second fuel cell stack 2, and the second fuel cell stack 2, the auxiliary machine structure 3, and the first fuel cell stack 1 are stacked in this order from the bottom.

The first fuel cell stack 1 is formed by sandwiching the fuel cells stacked in multiple stages with an end plate 11 as the upper end and an upper surface of the auxiliary machine structure 3 as a lower end, and pressing the fuel cells from a stacking direction with fastening bolts 12.

The second fuel cell stack 2 is formed by sandwiching the fuel cells stacked in multiple stages with an end plate 21 as the lower end and a lower surface of the auxiliary machine structure 3 as an upper end, and pressing the fuel cells from the stacking direction with fastening bolts 22.

A current collector plate (not illustrated) is disposed on each of a lower surface of the end plate 11 and the upper surface of the auxiliary machine structure 3. The current collector plate (not illustrated) is electrically connected to the fuel cells constituting the first fuel cell stack 1, but is electrically insulated from the end plate 11 and the auxiliary machine structure 3. Therefore, an extraction current of the first fuel cell stack 1 can be extracted from the pair of current collector plates (not illustrated). Similarly, a current collector plate (not illustrated) is disposed on each of an upper surface of the end plate 21 and the lower surface of the auxiliary machine structure 3, and an extraction current of the second fuel cell stack 2 can be extracted from the pair of current collector plates (not illustrated).

FIGS. 9, 10, and the like illustrate the combustor 67 disposed in a central portion of the auxiliary machine structure 3 and the heat exchanger 65 disposed inside the combustor 67. FIGS. 9, 10, and the like illustrate the fuel flow paths 32A each introducing fuel from the outside and supplying the fuel to the anode of the first fuel cell stack 1, the fuel flow paths 32B each connecting the anode outlet of the first fuel cell stack 1 and the anode inlet of the second fuel cell stack 2, the air flow path 33A that supplies air to the heat exchanger 65, the air flow path 33C connecting the cathode outlet of the second fuel cell stack 2 and the cathode inlet of the first fuel cell stack 1, the air flow path 33D that supplies air (oxygen) exhausted from the cathode of the first fuel cell stack 1 to the combustor 67, and the off-gas flow path 34 for discharging the combustion gas discharged from the combustor 67 to the outside.

As illustrated in FIGS. 9 to 11, the fuel flow paths 32B and the air flow path 33C are disposed at positions close to the front side of the vehicle relative to the combustor 67 (the heat exchanger 65) in the auxiliary machine structure 3. The fuel flow paths 32B connect the anode outlet of the first fuel cell stack 1 and the anode inlet of the second fuel cell stack 2, and are disposed in a pair, in which one fuel flow path 32B is disposed on one end side of the auxiliary machine structure 3 in the width direction of the electric vehicle, and the other fuel flow path 32B is disposed on the other end side of the auxiliary machine structure 3 in the width direction of the vehicle.

The air flow path 33C connects the cathode outlet of the second fuel cell stack 2 and the cathode inlet of the first fuel cell stack 1. The air flow path 33C is disposed between the pair of fuel flow paths 32B, and is widely formed in the width direction of the electric vehicle. As illustrated in FIG. 10, the air flow path 33C has substantially the same length as the heat exchanger 65 in the width direction of the electric vehicle, and is disposed in a manner of covering the heat exchanger 65 when viewed from the vehicle front side as illustrated in FIG. 11. A side surface of the auxiliary machine structure 3 on the vehicle front side is a portion where a heat dissipation amount is largest due to the influence of the traveling wind. Therefore, by disposing the air flow path 33C on the side surface, even in a configuration in which the heat exchanger 65 is disposed in front of the combustor 67 as illustrated in FIG. 3, the decrease in the temperature due to the traveling wind can be suppressed. In particular, by widely forming the air flow path 33C in the width direction of the electric vehicle, the decrease in the temperature of the heat exchanger 65 (and the combustor 67) due to the traveling wind can be efficiently suppressed. Since the air flow path 33C allows the cathode outlet of the second fuel cell stack 2 and the cathode inlet of the first fuel cell stack 1 to communicate with each other at a short distance, the heat dissipation amount therebetween can be suppressed.

[First Modification]

Figure 12:
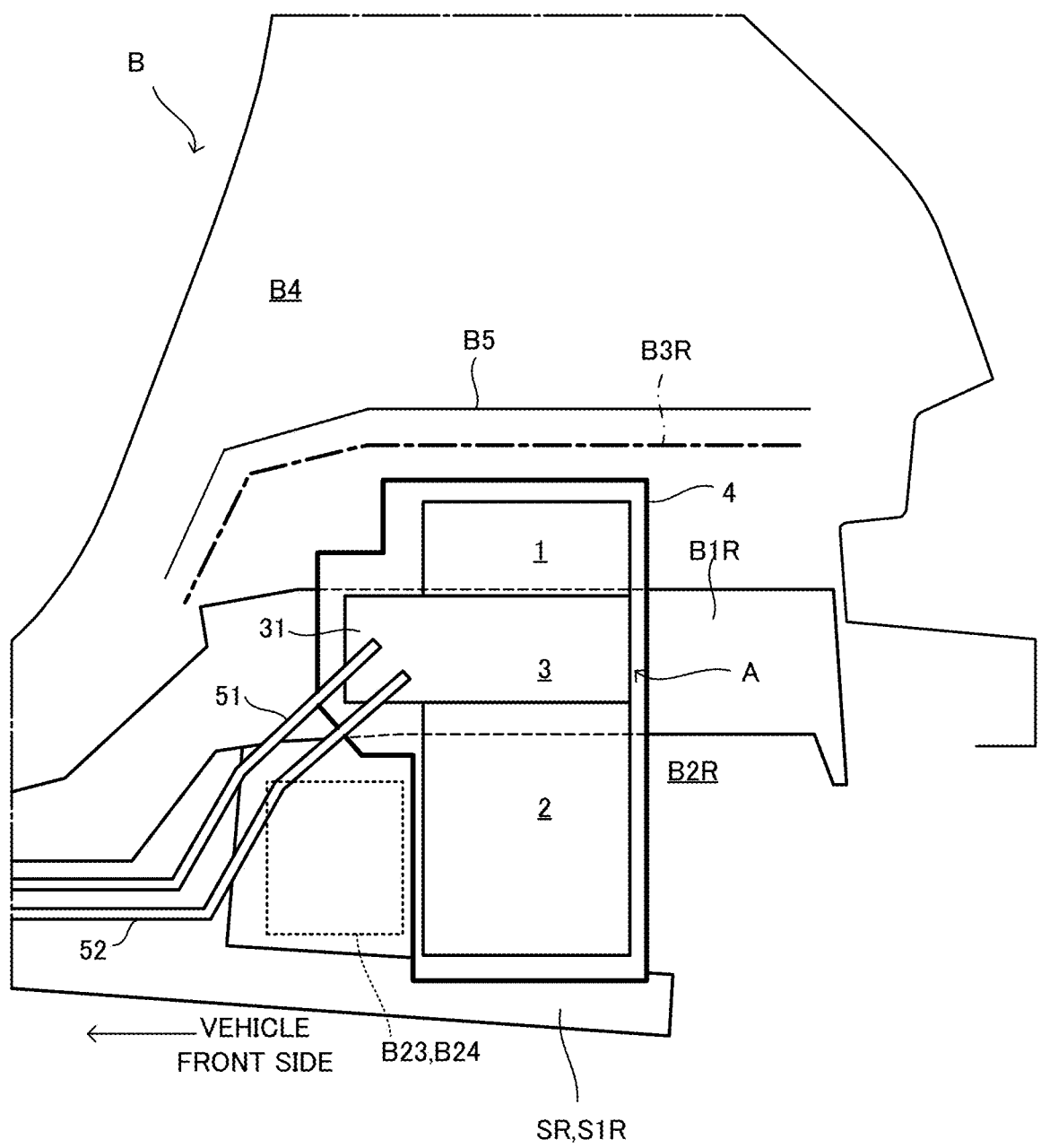
FIG. 12 is a diagram illustrating a first modification in which the in-vehicle fuel cell system according to the present embodiment is mounted on a vehicle rear side.

FIG. 12 is a diagram illustrating a first modification in which the in-vehicle fuel cell system according to the present embodiment is mounted on a vehicle rear side. An electric vehicle to which the fuel cell system according to the first modification is applied is an RR vehicle, and the fuel cell system according to the first modification is attached to the rear prime mover chamber B2R of the electric vehicle.

Side members B1R (see FIG. 14) are disposed on the rear side of a vehicle body in a manner of extending in a front-rear direction of the vehicle and sandwiching the rear prime mover chamber B2R in a vehicle width direction. The rear prime mover chamber B2R and the cabin B4 are partitioned by a floor plate B5.

When the electric vehicle is the RR vehicle, a front suspension device (not illustrated) has a structure in which a spring that supports the vehicle body B and a shock absorber that absorbs vibration from a road surface are attached to a sub-frame on which a steering device is mounted. The rear suspension device SR has a structure in which a spring (not illustrated) that supports the vehicle body B and a shock absorber (not illustrated) that absorbs vibration from the road surface are attached to the sub-frame S1R on which the drive device B23 (the drive motor 73, and a transaxle device) is mounted.

Similarly to the fuel cell system illustrated in FIG. 1 and the like, in the fuel cell system in the first modification, the stacked structure A in which the second fuel cell stack 2, the auxiliary machine structure 3, and the first fuel cell stack 1 are stacked in this order is accommodated in the case 4. The auxiliary machine structure 3 is disposed at substantially the same height position as the side member B1R, and the case 4 and the side member B1R are connected by brackets (the case-side bracket 41, the vehicle-side bracket B6) at substantially the same height position as the auxiliary machine structure 3 in the case 4, whereby the case 4 including the stacked structure A is fixed to the side member B1R.

As illustrated in FIG. 12, for example, in the rear prime mover chamber B2R, a distance in a height direction between the side member B1R and the floor plate B5 (a dimension of a first internal space in the height direction) is shorter than a distance in the height direction between the side member B1R and the sub-frame S1R (a dimension of a second internal space in the height direction). Therefore, by making the number of stacked fuel cells in the first fuel cell stack 1 smaller than the number of stacked fuel cells in the second fuel cell stack 2, the dimension of the first fuel cell stack 1 in the height direction is set smaller than the dimension of the second fuel cell stack 2 in the height direction.

As illustrated in FIG. 12, an upper end of the first fuel cell stack 1 (including an upper end of the case 4) is set lower than a virtual plane B3R positioned lower by a predetermined distance than the floor plate B5 positioned above the upper end. Accordingly, the fuel cell system can be mounted without changing a design of the cabin B4. Even if the floor plate B5 receives an impact from the cabin B4, damage to the fuel cell system can be avoided because the fuel cell system is separated from the floor plate B5 by a predetermined distance or more.

A lower end of the second fuel cell stack 2 (including a lower end of the case 4) is set higher than a lower end of the sub-frame S1R constituting the rear suspension device SR. Accordingly, a direct hit caused by an on-road obstacle such as a curbstone or a rut can be avoided.

An end portion (a side surface) of the stacked structure A (the first fuel cell stack 1, the auxiliary machine structure 3, and the second fuel cell stack 2) on the rear side of the electric vehicle is formed on substantially the same plane, and a part of the auxiliary machine structure 3 is formed as the protruding portion 31 that protrudes forward relative to the first fuel cell stack 1 and the second fuel cell stack 2 in an end portion of the stacked structure A on a vehicle front side. In this case, for example, the case 4 including the stacked structure A illustrated in FIG. 2 and the like may be mounted on the rear prime mover chamber B2R while being reversed in the front-rear direction of the electric vehicle.

Accordingly, in the rear prime mover chamber B2R, the drive device B23 (the drive motor 73 (see FIG. 7), and the transaxle device) can be disposed in a region surrounded by the protruding portion 31, the second fuel cell stack 2 (including the case 4), and the sub-frame S1R, and the inside of the rear prime mover chamber B2R can be effectively used.

At least one of pipes (the fuel supply pipe 51, and the air supply pipe 52) is connected to the protruding portion 31. Accordingly, in the first modification, the combustor 67 and the heat exchanger 65 can also be disposed directly below the first fuel cell stack 1 and directly above the second fuel cell stack 2.

In the above configuration, the fuel tank 61 (not illustrated) and the compressor 64 (not illustrated) are disposed in a front prime mover chamber (not illustrated), the fuel tank 61 communicates with the protruding portion 31 (the auxiliary machine structure 3) via the fuel supply pipe 51, and the compressor 64 communicates with the protruding portion 31 (the auxiliary machine structure 3) via the air supply pipe 52. Of course, the fuel tank 61 and the compressor 64 may be disposed in the rear prime mover chamber B2R.

Comparison Between First Modification and Comparative Example

Figure 13:
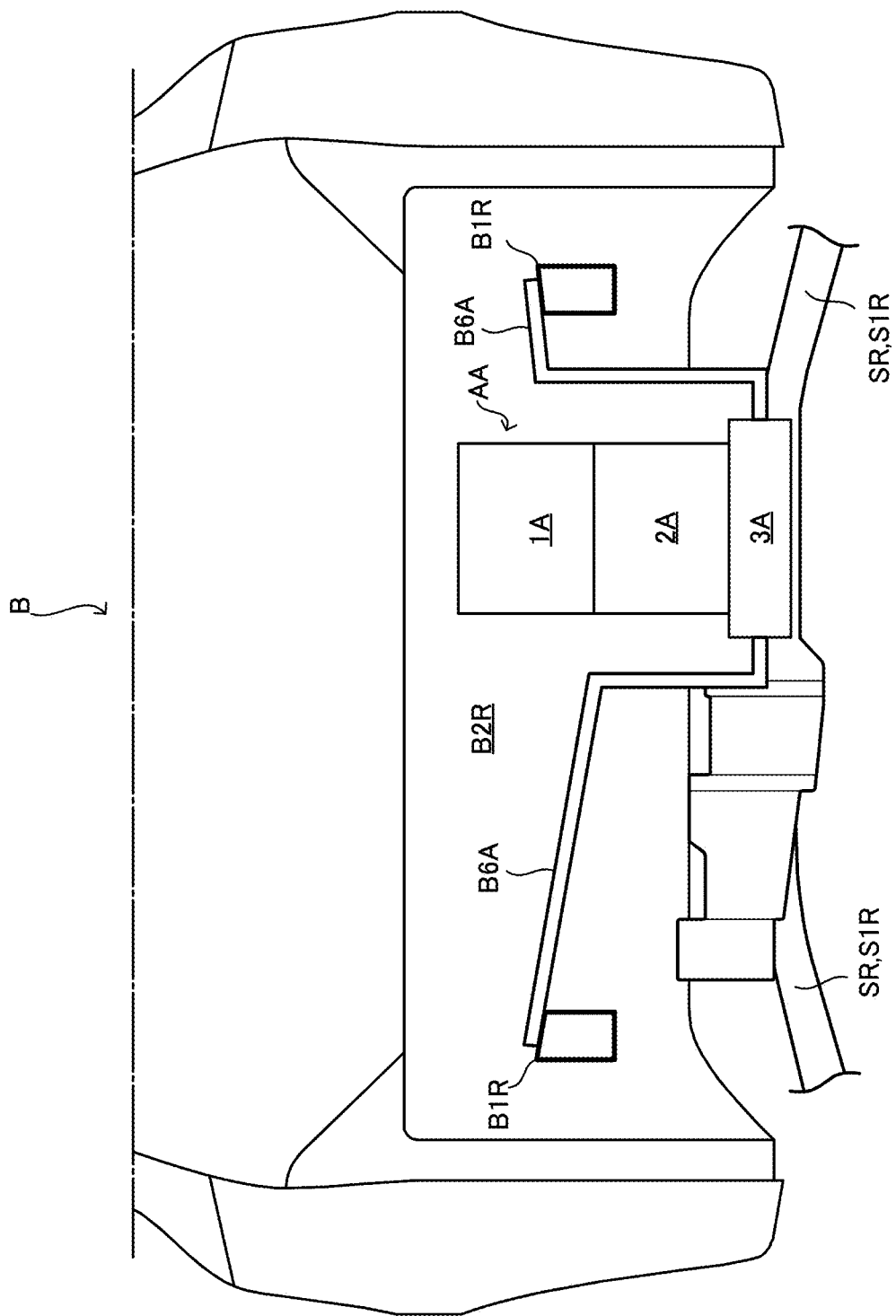
FIG. 13 is a view from the vehicle rear side in a case where the in-vehicle fuel cell system according to the comparative example is mounted on the vehicle rear side.
Figure 14:
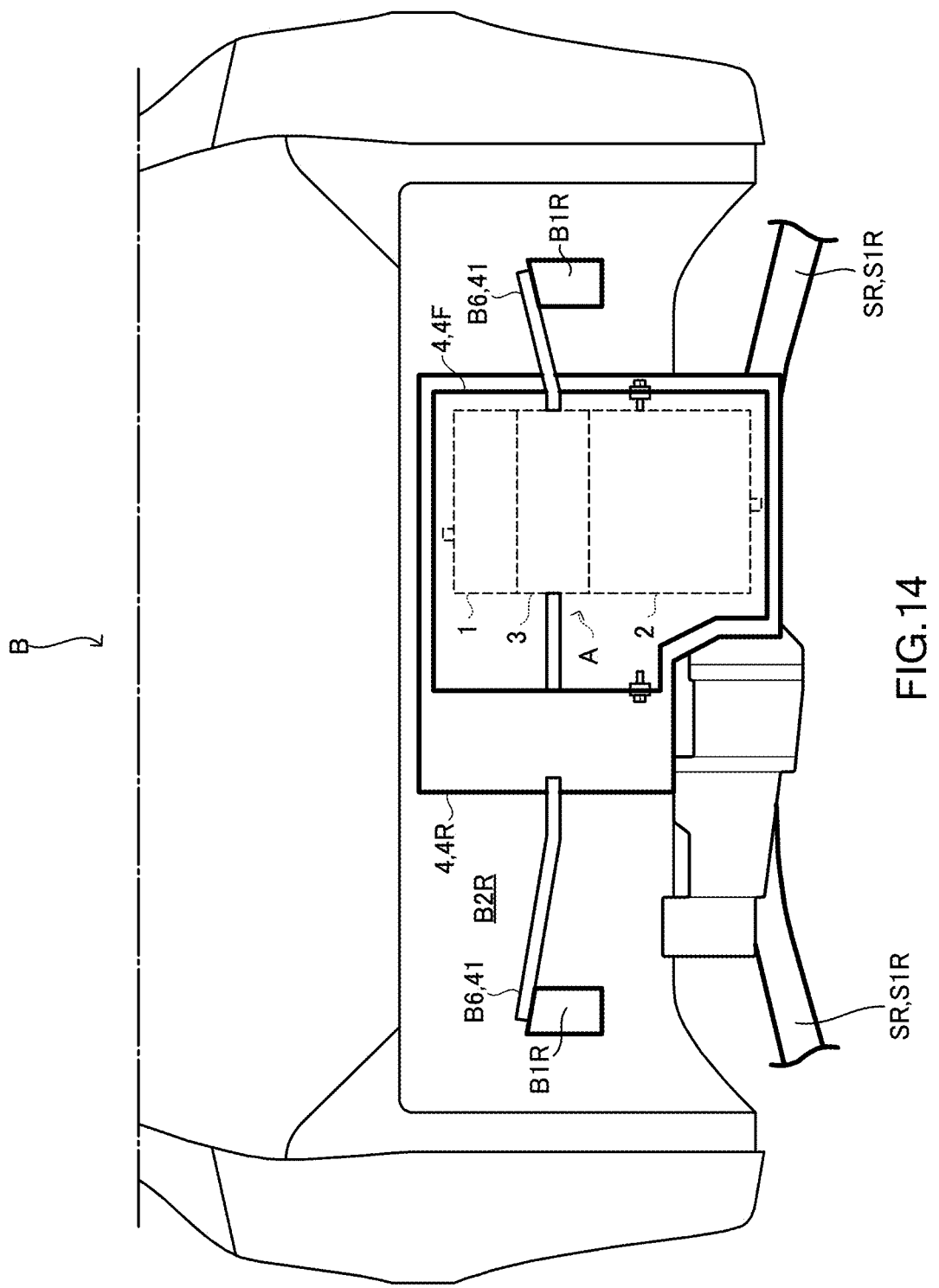
FIG. 14 is a view from the vehicle rear side of the first modification in which the in-vehicle fuel cell system according to the present embodiment is mounted on the vehicle rear side.

FIG. 13 is a view of the vehicle rear side in a case where the in-vehicle fuel cell system according to the comparative example is mounted on the vehicle rear side. FIG. 14 is a view from the vehicle rear side of the first modification in which the in-vehicle fuel cell system according to the present embodiment is mounted on the vehicle rear side.

Similarly to the fuel cell system illustrated in FIG. 5, the fuel cell system according to the comparative example illustrated in FIG. 13 includes the stacked structure AA in which the second fuel cell stack 2A and the first fuel cell stack 1A are disposed in order on the auxiliary machine structure 3A including the combustor, the heat exchanger, the reformer, and the like.

When such a stacked structure AA is disposed in the rear prime mover chamber B2R, the stacked structure AA is fixed to the side member B1R by using, for example, the bracket B6A. However, for the same reason as described above, the size of the bracket B6A for attaching the stacked structure AA to the side member B1R increases, and the weight increases accordingly. Accordingly, there is a concern that vibration damping performance and steering stability of the vehicle may be impaired.

On the other hand, the auxiliary machine structure 3 constituting the stacked structure A in the first modification of the present embodiment illustrated in FIG. 14 is disposed at substantially the same height as the side member B1R. Therefore, for the same reason as described above, the sizes of the brackets (the case-side bracket 41, and the vehicle-side bracket B6) can be reduced, and since the center of gravity of the stacked structure A is close to the brackets, it is possible to suppress the amplitude of swing of the fuel cell system and the brackets during operation, and to improve vibration damping performance and steering stability of the vehicle.

[Second Modification]

Figure 15:
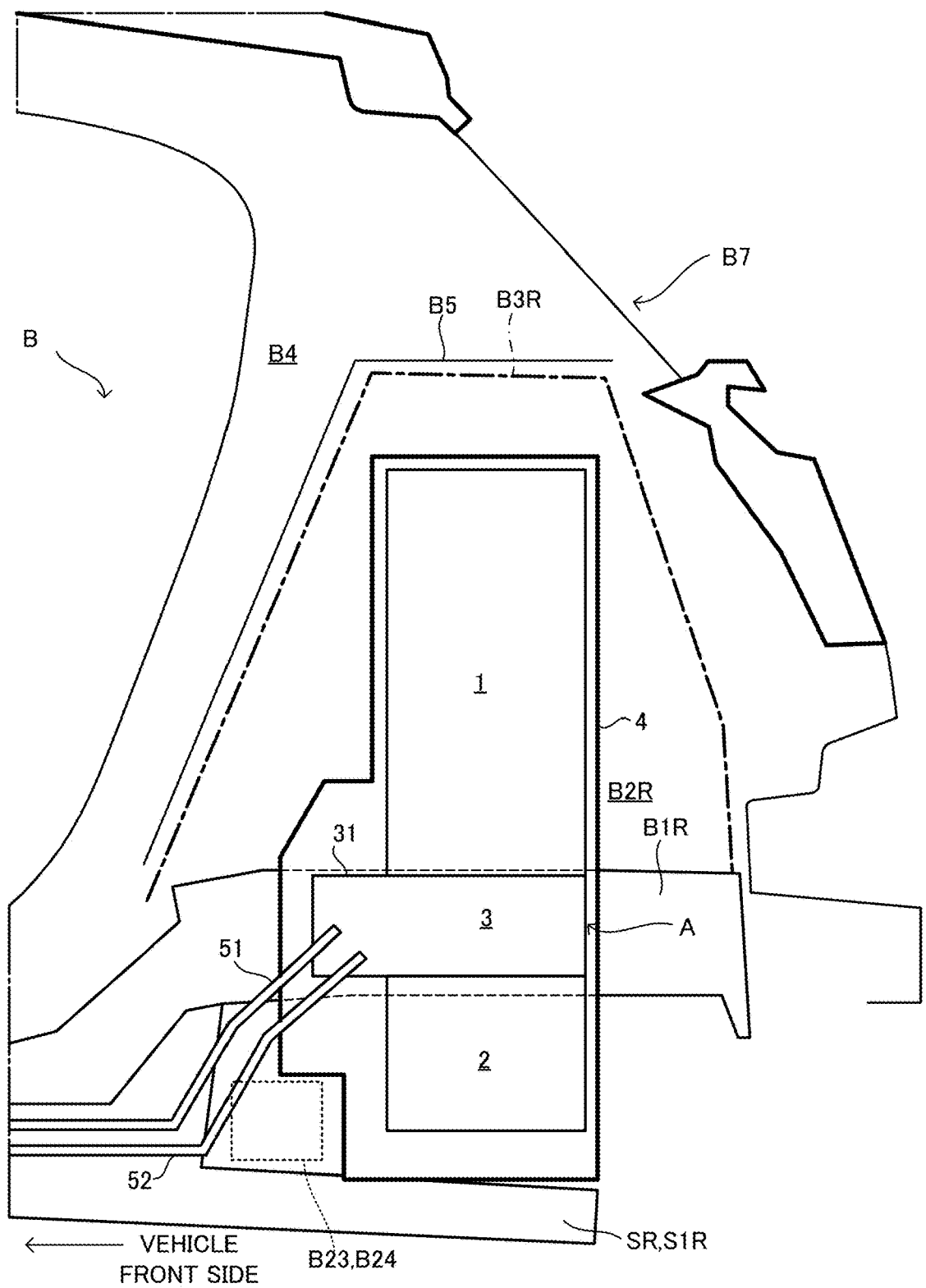
FIG. 15 is a diagram illustrating a second modification in which the in-vehicle fuel cell system according to the present embodiment is mounted on the vehicle rear side.

FIG. 15 is a diagram illustrating a second modification in which the in-vehicle fuel cell system according to the present embodiment is mounted on the vehicle rear side. In an electric vehicle to which the second modification is applied, the floor plate B5 behind the cabin B4 of the electric vehicle is set at, for example, substantially the same height as (or lower than) a lower end of a rear window B7.

As illustrated in FIG. 15, in the rear prime mover chamber B2R, a distance in a height direction between the side member B1R and the floor plate B5 (a height of a first internal space) is larger than a distance in the height direction between the side member B1R and the sub-frame S1R (a height of a second internal space). Therefore, by making the number of stacked fuel cells in the first fuel cell stack 1 larger than the number of stacked fuel cells in the second fuel cell stack 2, a dimension of the first fuel cell stack 1 in the height direction is set larger than a dimension of the second fuel cell stack 2 in the height direction. In this way, the number of stacked fuel cells can be appropriately set according to the dimensions of the first internal space and the second internal space in the height direction. Therefore, the stacked structure A (including the case 4) can be mounted on the rear prime mover chamber B2R in an optimal state without changing a design of the electric vehicle, and an output of the fuel cell stack can be optimized.

Effects of Present Embodiment

The in-vehicle fuel cell system according to the present embodiment includes: a fuel cell (the first fuel cell stack 1, the second fuel cell stack 2); an auxiliary machine (the combustor 67, the heat exchanger 65) configured to exchange a gas with the fuel cell (the first fuel cell stack 1, the second fuel cell stack 2); the in-vehicle fuel cell system includes: the auxiliary machine structure 3 configured to accommodate the auxiliary machine (the combustor 67, the heat exchanger 65), wherein the fuel cell (the first fuel cell stack 1, the second fuel cell stack 2) includes a first fuel cell (the first fuel cell stack 1) fixed to an upper surface of the auxiliary machine structure 3 and a second fuel cell (the second fuel cell stack 2) fixed to a lower surface of the auxiliary machine structure 3, the auxiliary machine structure 3 is disposed at substantially the same position in a height direction as a skeleton member (the side member B1F, the side member B1R) of the vehicle body B, and the first fuel cell (the first fuel cell stack 1) and the second fuel cell (the second fuel cell stack 2) are fixed to the skeleton member (the side member B1F, the side member B1R) via the auxiliary machine structure 3.

According to the above configuration, the auxiliary machine structure 3 is disposed at substantially the same height as the skeleton member (the side member B1F, the side member B1R). Therefore, the center of gravity of the stacked structure A is at substantially the same height as the skeleton member (the side member B1F, the side member B1R), and the stacked structure A can be attached to the skeleton member (the side member B1F, the side member B1R) via the brackets (the case-side bracket 41, the vehicle-side bracket B6) at the height position of the center of gravity of the stacked structure A (including the case 4), or the stacked structure A can be directly attached to the skeleton member (the side member B1F, the side member B1R). Accordingly, the sizes of the brackets (the case-side bracket 41, the vehicle-side bracket B6) can be reduced, and the center of gravity of the stacked structure A is close to the brackets (the case-side bracket 41, the vehicle-side bracket B6), and thus it is possible to suppress an amplitude of swing of the stacked structure A and the brackets (the case-side bracket 41, the vehicle-side bracket B6) during operation, and to improve vibration damping performance and steering stability of the vehicle.

In the present embodiment, the first fuel cell (the first fuel cell stack 1) is disposed in a first internal space occupying a position higher than the skeleton member (the side member B1F, the side member B1R) in the vehicle body B, and the second fuel cell (the second fuel cell stack 2) is disposed in a second internal space occupying a position lower than the skeleton member (the side member B1F, the side member B1R) in the vehicle body B. When a height dimension of the first internal space is larger than a height dimension of the second internal space, a height dimension of the first fuel cell is set to be larger than a height dimension of the second fuel cell, and when the height dimension of the second internal space is larger than the height dimension of the first internal space, the height dimension of the second fuel cell is set to be larger than the height of the first fuel cell.

Accordingly, the stacked structure A (including the case 4) including the first fuel cell (the first fuel cell stack 1), the auxiliary machine structure 3, and the second fuel cell (the second fuel cell stack 2) can be mounted on the first internal space and the second internal space (the front prime mover chamber B2F or the rear prime mover chamber B2R) in an optimum state without changing a design of the electric vehicle, and the output of the fuel cell stack (the first fuel cell stack 1, the second fuel cell stack 2) can be optimized.

In the present embodiment, when the in-vehicle fuel cell system is mounted on the front prime mover chamber B2F that is disposed above the front suspension device SF configured to support the vehicle body B and inside the vehicle body B, a lower surface of the second fuel cell (the second fuel cell stack 2) is disposed above a lower surface of a structural skeleton (the sub-frame S1F) constituting the front suspension device SF.

Accordingly, the fuel cell stack (in particular, the second fuel cell stack 2) can avoid a direct hit caused by an on-road obstacle such as a curbstone or a rut.

In the present embodiment, an upper surface of the first fuel cell (the first fuel cell stack 1) is disposed at a position lower than the virtual plane B3F set at a position lower than the hood B25 by a predetermined distance, the hood B25 covering the front prime mover chamber B2F.

Accordingly, a gap for impact reduction can be secured between the hood B25 and the stacked structure A (including the case 4), and thus for example, an impact on human at the time of occurrence of a traffic accident can be reduced, and particularly, a head of a pedestrian can be protected.

In the present embodiment, in the stacked structure A in which the second fuel cell (the second fuel cell stack 2), the auxiliary machine structure 3, and the first fuel cell (the first fuel cell stack 1) are stacked in this order, an end portion of the stacked structure A on the vehicle front side is formed on substantially the same plane, and the protruding portion 31, which is a part of the auxiliary machine structure 3 and protrudes rearward relative to the first fuel cell (the first fuel cell stack 1) and the second fuel cell (the second fuel cell stack 2), is formed at an end portion of the stacked structure A on the vehicle rear side.

Accordingly, since the end portion of the stacked structure A on the vehicle front side is formed on substantially the same plane, the stacked structure A (including the case 4) can be disposed close to the cooling device B21, and a space behind the stacked structure A (including the case 4) can be expanded accordingly.

By forming the protruding portion 31, the combustor 67 and the heat exchanger 65 can be disposed directly below the first fuel cell stack 1 and directly above the second fuel cell stack 2. Therefore, the off-gas (the fuel off-gas, the air off-gas) discharged from the fuel cell stack can be supplied to the combustor 67 in a shortest distance, and air heated by the heat exchanger 65 can be supplied to the fuel cell stack in a shortest distance. Heat generated by the combustor 67 (the heat exchanger 65) is easily transferred to the fuel cell stack, and a thermal efficiency is improved.

In the present embodiment, at least one of the fuel supply pipe 51 configured to supply fuel to the first fuel cell (the first fuel cell stack 1) and the second fuel cell (the second fuel cell stack 2), the air supply pipe 52 configured to supply air to the first fuel cell (the first fuel cell stack 1) and the second fuel cell (the second fuel cell stack 2), and the off-gas exhaust pipe 53 configured to exhaust an off-gas discharged from the first fuel cell (the first fuel cell stack 1) and the second fuel cell (the second fuel cell stack 2) is connected to the protruding portion 31.

Accordingly, the pipes (the fuel supply pipe 51, the air supply pipe 52, and the off-gas exhaust pipe 53) are disposed behind the stacked structure A, and thus a risk of damage to the pipes can be avoided when a frontal collision of the electric vehicle occurs.

In the present embodiment, when the in-vehicle fuel cell system is mounted on the rear prime mover chamber B2R that is disposed inside the vehicle body B and above the rear suspension device SR configured to support the vehicle body B, a lower surface of the second fuel cell (the second fuel cell stack 2) is disposed above a lower surface of a structural skeleton (the sub-frame S1R) constituting the rear suspension device SR.

Accordingly, the fuel cell stack (in particular, the second fuel cell stack 2) can avoid a direct hit caused by an on-road obstacle such as a curbstone or a rut.

In the present embodiment, an upper surface of the first fuel cell (the first fuel cell stack 1) is disposed at a position lower than the virtual plane B3R set at a position lower than the floor plate B5 at a rear portion of the cabin B4 by a predetermined distance.

Accordingly, the in-vehicle fuel cell system can be mounted without or with a minimized change in the design of the cabin B4. Even if the floor plate B5 receives an impact from the cabin B4, damage to the in-vehicle fuel cell system can be avoided because the fuel cell system is separated from the floor plate B5 by a predetermined distance or more.

In the present embodiment, when the in-vehicle fuel cell system is mounted on a vehicle in which a height of the floor plate B5 of the cabin B4 is set to be equal to or lower than a lower end of the rear window B7, an upper surface of the first fuel cell (the first fuel cell stack 1) is disposed at a position lower than the virtual plane B3R set at a position lower than the floor plate B5 of the cabin B4 by a predetermined distance.

Accordingly, the in-vehicle fuel cell system can be mounted without or with a minimized change in the design of the cabin B4. The stacked structure A (including the case 4) can be mounted on the first internal space and the second internal space (the rear prime mover chamber B2R) in an optimum state, and the output of the fuel cell stack (the first fuel cell stack 1, the second fuel cell stack 2) can be optimized.

In the present embodiment, in the stacked structure A in which the second fuel cell (the second fuel cell stack 2), the auxiliary machine structure 3, and the first fuel cell (the first fuel cell stack 1) are stacked in this order, an end portion of the stacked structure A on the vehicle rear side is formed on substantially the same plane, and the protruding portion 31, which is a part of the auxiliary machine structure 3 and protrudes forward relative to the first fuel cell (the first fuel cell stack 1) and the second fuel cell (the second fuel cell stack 2), is formed at an end portion of the stacked structure A on the vehicle front side.

Accordingly, in the rear prime mover chamber B2R, the drive device B23 (the drive motor 73 (see FIG. 7), and the transaxle device) can be disposed in a region surrounded by the protruding portion 31, the second fuel cell (the second fuel cell stack 2) (including the case 4), and the sub-frame S1R, and the inside of the rear prime mover chamber B2R can be effectively used. By forming the end portion of the auxiliary machine structure 3 on the vehicle rear side on substantially the same plane, it is possible to avoid interference between the end portion of the auxiliary machine structure 3 on the vehicle rear side and a rearmost portion of the rear prime mover chamber B2R.

In the present embodiment, at least one of the fuel supply pipe 51 configured to supply fuel to the first fuel cell (the first fuel cell stack 1) and the second fuel cell (the second fuel cell stack 2), and the air supply pipe 52 configured to supply air to the first fuel cell (the first fuel cell stack 1) and the second fuel cell (the second fuel cell stack 2) is connected to the protruding portion 31.

Accordingly, in the auxiliary machine structure 3, auxiliary machines (the combustor 67 and the heat exchanger 65) can be disposed directly below the first fuel cell stack 1 and directly above the second fuel cell stack 2. Therefore, air heated by the heat exchanger 65 can be supplied to the fuel cell stack in a shortest distance. Heat generated by the combustor 67 (the heat exchanger 65) is easily transferred to the fuel cell stack, and a thermal efficiency is improved.

In the present embodiment, the auxiliary machine structure 3 includes the air flow path 33C connecting a cathode of the first fuel cell (the first fuel cell stack 1) and a cathode of the second fuel cell (the second fuel cell stack 2). The auxiliary machine includes the combustor 67 configured to mix and combust a fuel off-gas discharged from the first fuel cell (the first fuel cell stack 1) and the second fuel cell (the second fuel cell stack 2) and an air off-gas discharged from the first fuel cell (the first fuel cell stack 1) and the second fuel cell (the second fuel cell stack 2), and the heat exchanger 65 configured to heat, by heat of the combustor 67, air to be supplied to the first fuel cell (the first fuel cell stack 1) and the second fuel cell (the second fuel cell stack 2). The air flow path 33C is disposed on the vehicle front side relative to the combustor 67 and the heat exchanger 65 in the auxiliary machine structure 3.

The side surface of the auxiliary machine structure 3 on the vehicle front side is a portion where the heat dissipation amount is the largest due to the influence of the traveling wind. Accordingly, by disposing the air flow path 33C on the side surface of the auxiliary machine structure 3, which is on the vehicle front side, it is possible to suppress the decrease in the temperature of the heat exchanger 65 (and the combustor 67) due to the traveling wind. Since the air flow path 33C allows the cathode outlet of the second fuel cell stack 2 and the cathode inlet of the first fuel cell stack 1 to communicate with each other at a short distance, the heat dissipation amount therebetween can be suppressed.

In the present embodiment, the auxiliary machine structure 3 includes a pair of fuel flow paths 32B connecting an anode of the first fuel cell (the first fuel cell stack 1) and an anode of the second fuel cell (the second fuel cell stack 2). The pair of fuel flow paths 32B are disposed on both end sides of the vehicle in a width direction in the auxiliary machine structure 3. The air flow path 33C is disposed between the pair of fuel flow paths 32B in the auxiliary machine structure 3, and is widely disposed in a manner that both ends of the air flow path 33C in the width direction are adjacent to the fuel flow paths 32B.

Accordingly, the air flow path 33C is formed to be flat as a whole by reducing a dimension in the front-rear direction of the vehicle while maintaining a cross-sectional area (a pressure loss), and a space of the auxiliary machine structure 3 in the front-rear direction of the vehicle can be secured.

In the present embodiment, the air flow path 33C is disposed in a manner of covering the heat exchanger 65 when viewed from the vehicle front side of the auxiliary machine structure 3.

Accordingly, by widely forming the air flow path 33C in the width direction of the electric vehicle, the decrease in the temperature of the heat exchanger 65 (and the combustor 67) due to the traveling wind can be efficiently suppressed.

Although the embodiment of the present invention has been described above, the above-mentioned embodiment is merely a part of application examples of the present invention, and does not mean that the technical scope of the present invention is limited to the specific configurations of the above-mentioned embodiment.

The invention claimed is:

1. A fuel cell system in a vehicle comprising a vehicle body that comprises a skeleton member, the fuel cell system comprising:
a first fuel cell;
a second fuel cell;
an auxiliary machine configured to exchange a gas with the first fuel cell and the second fuel cell; and
an auxiliary machine structure that houses the auxiliary machine, wherein;
the first fuel cell is fixed to an upper surface of the auxiliary machine structure and the second fuel cell is fixed to a lower surface of the auxiliary machine structure,
the auxiliary machine structure is disposed at substantially the same position in a height direction as the skeleton member of the vehicle body, and
the first fuel cell and the second fuel cell are fixed to the skeleton member via the auxiliary machine structure.

2. The fuel cell system according to claim 1, wherein:
the first fuel cell is disposed in a first internal space of the vehicle body occupying a position higher than the skeleton member,
the second fuel cell is disposed in a second internal space of the vehicle body occupying a position lower than the skeleton member, and
(a) a height dimension of the first internal space is larger than a height dimension of the second internal space, and a height dimension of the first fuel cell is larger than a height dimension of the second fuel cell, or (b) the height dimension of the second internal space is larger than the height dimension of the first internal space, and the height dimension of the second fuel cell is larger than the height dimension of the first fuel cell.

3. The fuel cell system according to claim 1 wherein:
the fuel cell system is mounted in a front prime mover chamber of the vehicle body and above a front suspension device configured to support the vehicle body, and
a lower surface of the second fuel cell is disposed above a lower surface of the front suspension device.

4. The fuel cell system according to claim 3, wherein;
an upper surface of the first fuel cell is disposed at a position lower than a plane set at a position lower than a hood, the hood covering the front prime mover chamber.

5. The fuel cell system according to claim 3, wherein:
the second fuel cell, the auxiliary machine structure, and the first fuel cell are stacked in this order as a stacked structure,
an end portion of the stacked structure on a vehicle front side is formed on substantially a single plane, and
a protruding portion of the auxiliary machine structure protrudes rearward relative to the first fuel cell and the second fuel cell.

6. The fuel cell system according to claim 5, wherein:
the protruding portion is connected with at least one of a fuel supply pipe configured to supply fuel to the first fuel cell and the second fuel cell, an air supply pipe configured to supply air to the first fuel cell and the second fuel cell, or an off-gas exhaust pipe configured to exhaust off-gas discharged from the first fuel cell and the second fuel cell.

7. The fuel cell system according to claim 1, wherein:
the fuel cell system is mounted on a rear prime mover chamber that is disposed inside the vehicle body and above a rear suspension device configured to support the vehicle body, and
a lower surface of the second fuel cell is disposed above a lower surface of the rear suspension device.

8. The fuel cell system according to claim 7, wherein:
an upper surface of the first fuel cell is disposed at a position lower than a plane set at a position lower than a floor plate at a rear portion of a cabin.

9. The fuel cell system according to claim 7, wherein:
a height of a floor plate of a cabin of the vehicle is equal to or lower than a lower end of a rear window of the vehicle, and
an upper surface of the first fuel cell is disposed at a position lower than a plane set at a position lower than the floor plate of the cabin.

10. The fuel cell system according to claim 7, wherein:
the second fuel cell, the auxiliary machine structure, and the first fuel cell are stacked in this order as a stacked structure,
an end portion of the stacked structure on a vehicle rear side is formed on substantially a single plane, and
a protruding portion of the auxiliary machine structure protrudes forward relative to the first fuel cell and the second fuel cell.

11. The fuel cell system according to claim 10, wherein:
the protruding portion is connected with at least one of a fuel supply pipe configured to supply fuel to the first fuel cell and the second fuel cell or an air supply pipe configured to supply air to the first fuel cell and the second fuel cell.

12. The fuel cell system according to claim 3, wherein;
the auxiliary machine structure comprises an air flow path connecting a cathode of the first fuel cell and a cathode of the second fuel cell,
the auxiliary machine comprises:
a combustor configured to mix and combust fuel off-gas discharged from the first fuel cell and the second fuel cell and air off-gas discharged from the first fuel cell and the second fuel cell, and
a heat exchanger configured to heat, by heat of the combustor, air to be supplied to the first fuel cell and the second fuel cell, and
the air flow path is disposed on a vehicle front side relative to the combustor and the heat exchanger in the auxiliary machine structure.

13. The fuel cell system according to claim 12, wherein:
the auxiliary machine structure comprises a pair of fuel flow paths connecting an anode of the first fuel cell and an anode of the second fuel cell,
the pair of fuel flow paths are disposed on either side of the auxiliary machine structure in a vehicle width direction, and
the air flow path is disposed between the pair of fuel flow paths in the auxiliary machine structure with both ends of a cross-section of the air flow path in the vehicle width direction being adjacent to the fuel flow paths.

14. The fuel cell system according to claim 13, wherein:
the heat exchanger is substantially within a footprint of the air flow path when viewed from the vehicle front side of the auxiliary machine structure.

15. The fuel cell system according to claim 1, wherein:
the second fuel cell, the auxiliary machine structure, and the first fuel cell are stacked in this order as a stacked structure, and
a center of gravity of the stacked structure is at substantially a same height as the skeleton member.

* * * * *